(12) United States Patent
Kani et al.

(10) Patent No.: US 7,389,048 B2
(45) Date of Patent: Jun. 17, 2008

(54) OPTICAL WAVELENGTH-DIVISION MULTIPLE ACCESS SYSTEM AND OPTICAL NETWORK UNIT

(75) Inventors: Jun-ichi Kani, Narashino (JP); Katsumi Iwatsuki, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 493 days.

(21) Appl. No.: 10/525,407

(22) PCT Filed: Jun. 18, 2004

(86) PCT No.: PCT/JP2004/008952

§ 371 (c)(1),
(2), (4) Date: Feb. 23, 2005

(87) PCT Pub. No.: WO2004/114555

PCT Pub. Date: Dec. 29, 2004

(65) Prior Publication Data

US 2006/0146855 A1    Jul. 6, 2006

(30) Foreign Application Priority Data

Jun. 18, 2003  (JP) .............................. 2003-173898

(51) Int. Cl.
*H04J 14/00* (2006.01)
(52) U.S. Cl. .............................. 398/72; 398/66; 398/67; 398/68; 398/69; 398/70; 398/71; 398/79; 398/99; 398/100; 398/91; 398/59; 398/140; 398/141; 398/135; 398/82; 398/84; 398/87; 398/89; 385/24; 385/37
(58) Field of Classification Search ................... 398/72, 398/70, 71, 66, 67, 68, 69, 79, 99, 100, 59, 398/140, 141, 135, 182, 87, 82, 84, 89, 91; 385/24, 37

See application file for complete search history.

(56) References Cited

U.S. PATENT DOCUMENTS

2005/0286895 A1* 12/2005 Lee et al. ....................... 398/79

FOREIGN PATENT DOCUMENTS

| JP | 2000-196536 | 7/2000 |
|---|---|---|
| JP | 2001-177505 | 6/2001 |

OTHER PUBLICATIONS

Jun-ichi Kani et al., *A WDM-Based Optical Access Network for Wide-Area Gigabit Access Services*, IEEE Optical Communications, vol. 41, Issue 2, Feb. 2003, pp. S43-S48.

(Continued)

*Primary Examiner*—Hanh Phan
(74) *Attorney, Agent, or Firm*—Workman Nydegger

(57) ABSTRACT

The present invention provides an optical wavelength-division multiple access system and a corresponding optical network unit. A wavelength band Da (wavelengths $\lambda d1$ to $\lambda dn$) for downlink optical signals corresponding to the n ONUs, a wavelength band Ua (wavelengths $\lambda u1$ to $\lambda un$) for uplink optical signals corresponding to the n ONUs, a wavelength band Db (wavelengths $\lambda dn+1$ to $\lambda dn+m$) for downlink optical signals corresponding to the m ONUs, and a wavelength band Ub (wavelengths $\lambda un+1$ to $\lambda un+m$) for uplink optical signals corresponding to the m ONUs are set different from one another, the wavelength bands Ua and Ub are set adjacent to each other, and the wavelength bands Ua and Da or the wavelength bands Ub and Db are set adjacent to each other. Each of the ONUs has downlink optical signal receiving unit for receiving a downlink optical signal of one of the wavelengths $\lambda d1$ to $\lambda dn+m$ in the wavelength bands Da and Db which wavelength is assigned to the ONU, and uplink optical signal receiving unit for receiving an uplink optical signal of one of the wavelengths $\lambda u1$ to $\lambda un+m$ in the wavelength bands Ua and Ub which wavelength is assigned to the ONU or an uplink optical signal within a broad band including the wavelength bands Ua and Ub.

9 Claims, 18 Drawing Sheets

OTHER PUBLICATIONS

Koji Akimoto et al., *Gigabit WDM-PON Systems Using Spectrum Slicing Technologies*, The Institute of Electronics, Information and Communication Engineers, May 2003, pp. 25-30.

ITU-T Recommendations G.983.1, Oct. 1998, p. 19.

Koji Akimoto et al., *Spectrum-sliced, 25-GHz Spaced, 155 Mbps X 32 Channel WDM Acess*, The 4th Pacific Rim Conference on Lasers and Electro-Optics, 2001, vol. 2, pp. II-556-557.

Koji Akimoto et al., *Gigabit WDM-PON System Using Spectrum-Slicing Technologies*, ECOC 2003: 29th European Conference on Optical Communication Paper, #TH2.4.6.

* cited by examiner

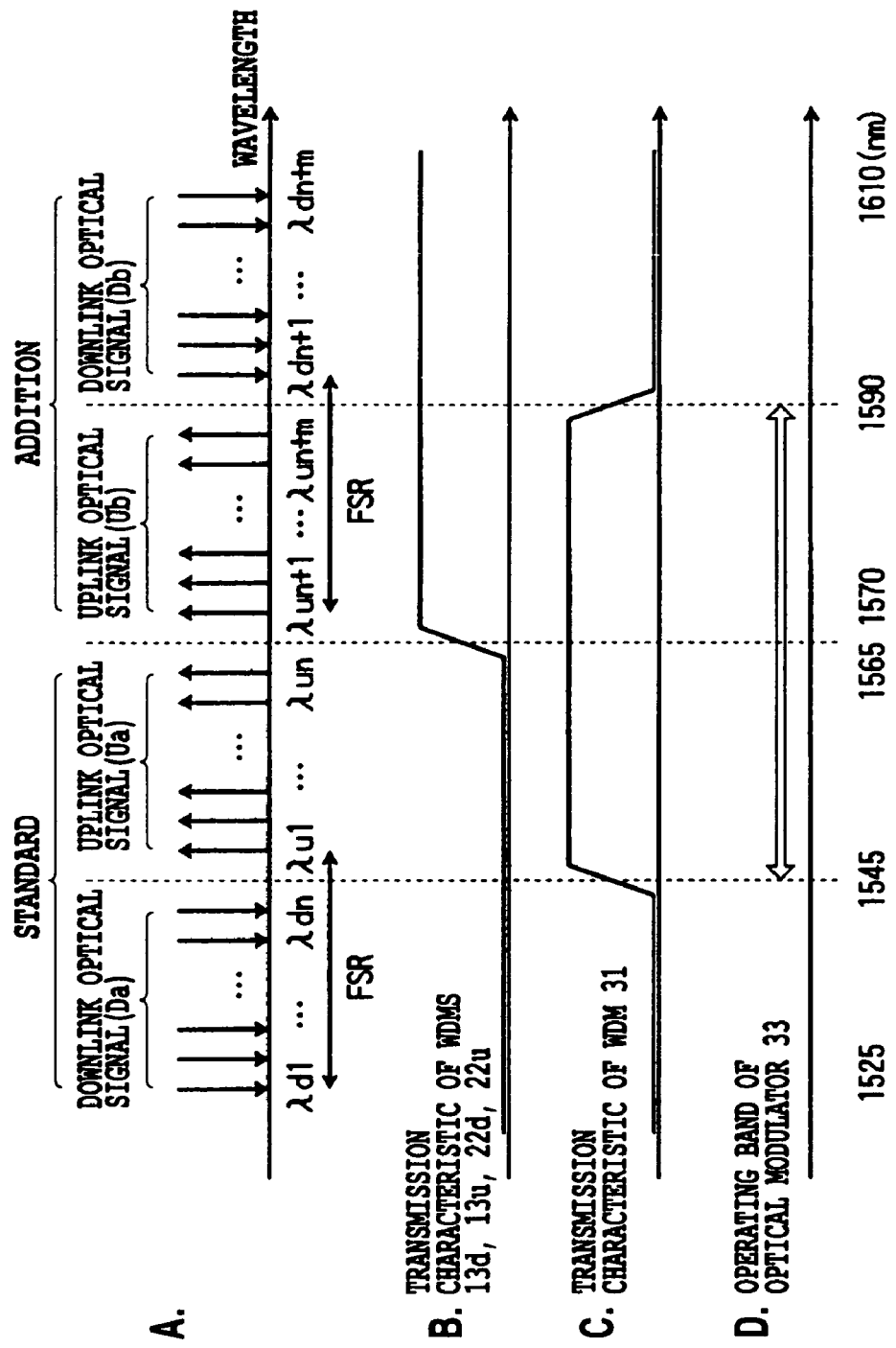

OPTICAL WAVELENGTH-DIVISION MULTIPLE ACCESS SYSTEM AND OPTICAL NETWORK UNIT

TECHNICAL FIELD

The present invention relates to an optical wavelength-division multiple access system that facilitates installation of additional optical network units in a system that bidirectionally transmits optical signals between a center apparatus (OLT: Optical Line Terminal) and a plurality of optical network units (ONUs: Optical Network Units), as well corresponding optical network units.

BACKGROUND ART

FIG. 1A shows an example of the configuration of a conventional optical wavelength-division multiplex(ing) (WDM) access system (Japanese Patent Application Laid-open No. 2000-196536). In FIG. 1A, a center apparatus (OLT) 50 and a wavelength multi/demultiplex(ing) apparatus 60 are connected together in a multiplex section via multiplex section optical fibers 1 and 2. The wavelength multi/demultiplex(ing) apparatus 60 and a plurality of optical network units (ONUs) 70-1 to 70-n are connected together in an access section via access section optical fibers 3 and 4. In this case, one wavelength band D is assigned to downlink signals from the OLT to the ONUs. One wavelength band U (≠ED) is assigned to uplink signals from the ONUs to the OLT. In the example shown below, wavelengths d1 to $\lambda$d1 to $\lambda$dn in the wavelength band D and wavelengths $\lambda$u1 to $\lambda$un in the wavelength band U are assigned to the respective ONUs.

A transmission section (S) 51 of the OLT 50 multiplexes the wavelengths of a downlink optical signal within the wavelength band D ($\lambda$d1 to $\lambda$dn) and of an optical carrier for an uplink signal within the wavelength band U ($\lambda$u1 to $\lambda$un). The transmission section (S) 51 then transmits the resulting signals to the wavelength multi/demultiplex(ing) apparatus 60. The wavelength multi/demultiplex(ing) apparatus 60 divides the downlink optical signal within the wavelength band D and the optical carrier for the uplink signal within the wavelength band U into the respective wavelengths. The wavelength multi/demultiplex(ing) apparatus 60 transmits, via the access section optical fiber 3, the pairs of the downlink optical signals of the wavelengths $\lambda$d1 to $\lambda$dn and uplink optical carrier of the wavelengths $\lambda$u1 to $\lambda$un obtained by the division and corresponding ONUs 70-1 to 70-n.

The ONU 70-1 uses a WDM coupler 71 to demultiplex the downlink optical signal of the wavelength $\lambda$d1 from the optical carrier for the uplink signal of the wavelength $\lambda$u1, the signal and carrier having been transmitted. The ONU 70-1 further uses an optical receiver (R) 72 to receive the downlink optical signal of the wavelength $\lambda$d1. The ONU 70-1 also uses an optical modulator (M) 73 to obtain an uplink optical signal from the optical carrier for the uplink signal and then transmits the signal to the wavelength multi/demultiplex(ing) apparatus 60 via the access section optical fiber 4. This also applies to the other ONUs. The wavelength multi/demultiplex(ing) apparatus 60 multiplexes the wavelengths of the uplink optical signals of the wavelengths $\lambda$u1 to $\lambda$un transmitted by the ONUs. The uplink optical signals wavelength-multiplexed are transmitted to the OLT 50 via the multiplex section optical fiber 2. A reception section (R) 52 then receives the signals.

In this case, as shown in FIG. 1B, the wavelength band D (wavelength $\lambda$d1 to $\lambda$dn) for the downlink optical signals and the wavelength band U (wavelength $\lambda$u1 to $\lambda$un) for the uplink optical signals (the optical carrier for the uplink signal) are arranged so as not to overlap on a wavelength axis. An arrayed waveguide grating (AWG) 61 used as the wavelength multi/demultiplex(ing) apparatus 60 has a function for demultiplexing and sending a downlink signal wavelength (for example, $\lambda$d1) and uplink signal wavelength (for example, $\lambda$u1) within an FSR (Free Spectral Range) to the same port. A pair of a downlink optical signal having a wavelength within the wavelength band D and an uplink optical signal having a wavelength within the wavelength band U are input to each ONU. Thus, as shown in FIG. 1C, by using WDM couplers 71 conforming to the same specifications and which separate the wavelength bands D and N from each other, it is possible to separate the downlink optical signal from the uplink optical signal to prevent their mutual interferences.

A method has been proposed with which when the transmission section 51 of the OLT 50 transmits optical carriers for uplink signals of the wavelengths $\lambda$u1 to $\lambda$un, broadband light containing the wavelengths $\lambda$u1 to $\lambda$un is used and with which the AWG 61 of the wavelength multi/demultiplex(ing) apparatus 60 spectrum-slices the light to obtain optical carriers for uplink signals of the wavelengths $\lambda$u1 to $\lambda$un, which are then supplied to the ONUs (Japanese Patent Application Laid-open No. 2001-177505).

Such improvements are intended to allow the ONUs 70-1 to 70-n to be composed of common devices (a reduction in the number of types of devices). Specifically, the OLT 50 supplies optical carriers for uplink signals of the respective wavelengths to the corresponding ONUs. Thus, the ONUs need not comprise the respective light sources for the assigned wavelengths. The ONUs can utilize optical modulators 73 conforming to the same specifications, for the wavelength band U. Moreover, one downlink signal within the wavelength band D and one uplink signal within the wavelength band U are input to each ONU. The ONUs can use the WDM couplers 71 conforming to the same specifications and which separate the wavelength bands D and U from each other, in order to separate the downlink optical signal from the optical carrier for the uplink signal.

Further, in a configuration in which the OLT 50 is located opposite the plurality of ONUs 70-1 to 70-n via the AWG 61 or multiport wavelength filters as shown in FIG. 2A, the use of a wavelength variable light source as an optical transmitter (S) 75 makes it possible to arrange optical transmitters conforming to the same specifications, in the ONUs. In this case, the ONUs 70-1 to 70-n transmit uplink optical signals of the different wavelengths $\lambda$u1 to $\lambda$un; FIG. 2B shows the wavelength characteristics of the ONUs.

Moreover, similarly, in connection with a configuration shown in FIG. 2A, a proposal described below has been proposed (Akimoto, K, et al., "Spectrum-sliced, 25-GHz spaced, 155 Mbps×32 channel WDM access", The 4th Pacific Rim Conference on Lasers and Electro-Optics, 2001 (CLEO/Pacific Rim 2001), Vol. 2, pp. II-556-557). The optical transmitter 75 of each ONU modulates broadband light having a wide spectrum width in the wavelength band U; FIG. 2C shows the wavelength characteristics of the optical transmitter 75. Each ONU modulates the broadband light to obtain an uplink optical signal and then transmits the signal. The wavelength multi/demultiplex(ing) apparatus 60 spectrum-slices the uplink optical signal to multiplex their wavelengths and then transmits the resultant signals to the OLT 50. This configuration is substantially equivalent to that in which the ONUs transmit uplink optical signals of different wavelengths. However, this configuration is characterized in that optical transmitters conforming to the same specifications can be arranged in the ONUs.

It is possible to use an electric signal to directly modulate a superluminescent diode or a semiconductor optical amplifier (SOA) in order to obtain modulated light of a large optical spectral width. Alternatively, it is possible to use an external modulator to modulate output light (broadband non-modulated light) from a semiconductor optical amplifier or an erbium-doped fiber amplifier (EDFA).

If ONUs accommodated in the OLT are added to a conventional optical wavelength-division multiplex(ing) system, different wavelength bands are set for the wavelengths assigned to the standard ONUs and for the wavelengths assigned to the additional ONUs. In general, a configuration such as the one shown in FIG. 3 is possible. Basically, in this configuration, a standard and additional versions of each component are arranged in parallel; the components include the transmission section 51 and reception section 52 of the OLT 50, the AWG 61 of the wavelength multi/demultiplex(ing) apparatus 60, and the ONUs 70-1 to 70-n, all of which are shown in FIG. 1.

In this case, the wavelengths $\lambda d1$ to $\lambda dn$ of a wavelength band Da for downlink signals and the wavelengths $\lambda u1$ to $\lambda un$ of a wavelength band Ua for uplink signals are assigned to the standard ONUs 70-1 to 70-n. Further, the wavelengths $\lambda dn+1$ to $\lambda dn+m$ of a wavelength band Db for downlink signals and wavelengths $\lambda un+1$ to $\lambda un+m$ of a wavelength band Ub for uplink signals are assigned to additional ONUs 70-n+1 to 70-n.

The OLT 50 comprises a standard transmission section (Sa) 51a that multiplexes the wavelengths of and transmits downlink optical signals in the wavelength band Da ($\lambda d1$ to $\lambda dn$) and optical carriers for uplink signals in the wavelength band Ua ($\lambda u1$ to $\lambda un$). The OLT 50 also comprises an additional transmission section (Sb) 51b that multiplexes the wavelengths of and transmits downlink optical signals in the wavelength band Db ($\lambda dn+1$ to $\lambda dn+m$) and optical carriers for uplink signals in the wavelength band Ub ($\lambda un+1$ to $\lambda un+m$). Moreover, the OLT 50 comprises a standard reception section (Ra) 52a that receives optical signals in the wavelength band Ua ($\lambda u1$ to $\lambda un$) and an additional reception section (Rb) 52b that receives optical signals in the wavelength band Ub ($\lambda un+1$ to $\lambda un+m$).

A WDM coupler 53d multiplexes the wavelengths of standard and additional downlink optical signals and optical carriers for uplink signals transmitted by the standard transmission section 51a and the additional transmission section 51b. The WDM coupler 53d then transmits the resultant signals to the wavelength multi/demultiplex(ing) apparatus 60 via the multiple section optical fiber 1. The wavelength multi/demultiplex(ing) apparatus 60 uses a WDM coupler 62d to separate the standard wavelength bands Da and Ua from the additional wavelength bands Db and Ub. The wavelength multi/demultiplex(ing) apparatus 60 uses AWGs 61a and 61b to divide the wavelength bands separated, into downlink optical signals and optical carriers for uplink signals of the respective wavelengths. Pairs of downlink optical signals of the wavelengths $\lambda d1$ to $\lambda dn$ and optical carriers for uplink signals of the wavelengths $\lambda u1$ to $\lambda un$ which have been divided by the AWG 61a are transmitted to the corresponding ONUs 70-1 to 70-n via the access section optical fiber 3. Pairs of downlink optical signals of the wavelengths $\lambda dn+1$ to $\lambda dn+m$ and optical carriers for uplink signals of the wavelengths $\lambda un+1$ to $\lambda un+m$ which have been divided by the AWG 61b are transmitted to the corresponding ONUs 70-n+1 to 70-n+m via the access section optical fiber 3.

WDM couplers 71a of the standard ONUs 70-1 to 70-n are equally characterized by demultiplexing the wavelength bands Da and Ua. Optical modulators 73a of the standard ONUs 70-1 to 70-n are equally characterized by modulating optical carriers of the wavelength band Ua. On the other hand, WDM couplers 71b of the standard ONUs 70-n+1 to 70-n+m are equally characterized by demultiplexing the wavelength bands Db and Ub. Optical modulators 73b of the standard ONUs 70-n+1 to 70-n+m are equally characterized by modulating optical carriers of the wavelength band Ub. Uplink optical signals transmitted by each pair of ONUs are transmitted to the AWGs 61a and 61b of the wavelength multi/demultiplex(ing) apparatus 60 via the access section optical fiber 4. Then, a WDM coupler 62u demultiplexes the standard and additional uplink optical signals wavelength-multiplexed. The WDM coupler 62u then transmits the resultant signals to the OLT 50 via the uplink multiple section optical fiber 2. The OLT 50 uses a WDM coupler 53u to separate the standard wavelength band Ua from the additional wavelength band Ub. The standard and additional reception sections 52a and 52b receive the wavelength bands separated.

A wavelength-division multiplex(ing) access system shown in FIG. 3 is obtained simply by expanding the conventional wavelength-division multiplex(ing) access system shown in FIG. 1A. As shown in FIG. 4A, the wavelengths $\lambda d1$ to $\lambda dn$ of the wavelength band Da are assigned to standard downlink signals. The wavelengths $\lambda un+1$ to $\lambda un+m$ of the wavelength band Ua are assigned to standard uplink signals. The wavelengths $\lambda dn+1$ to $\lambda dn+m$ of the wavelength band Db are assigned to additional downlink signals. The wavelengths $\lambda un+1$ to $\lambda un+m$ of the wavelength band Ub are assigned to standard downlink signals. Further, the wavelength bands Ua, Da, Ub, and Db are assigned to the wavelength axis on this order.

With this assignment, as shown in FIG. 4B, the transmission characteristics of the WDM couplers 53d and 53u of the OLT 50 and of the WDM couplers 62d and 62u of the wavelength multi/demultiplex(ing) apparatus 60 may be such that they can merge or separate the standard wavelength bands Ua and Da with or from the additional wavelength bands Ub and Db. Accordingly, all of these components may conform to the same specifications.

However, the WDM couplers 71a of the standard ONUs 70-1 to 70-n separate the wavelength bands Ua and Da from each other. The WDM couplers 71b of the additional ONUs 70-n+1 to 70-n+m separate the wavelength bands Ub and Db form each other. Accordingly, these components require different transmission characteristics as shown in FIGS. 4C and 4D. Similarly, the operating bands of the standard and additional optical modulators 73a and 73b are different, the standard and additional optical modulators 73a and 73b operate in the wavelength bands Ua and Ub, respectively, as shown in FIGS. 4E and 4F. In other words, for the standard and additional ONUs, the WDM couplers 71a and 71b must conform to different specifications, and the optical modulators 73a and 73b conform to different specifications.

Common devices can be used as the WDM couplers 71a and 71b if they have a transmission characteristic such that the wavelength bands Da and Ub can be separated from the wavelength bands Ua and Db, shown in FIG. 4G. However, different optical receivers and different connection ports must be used for the standard and additional WDM couplers and the standard and additional optical modulators, respectively. Thus, this configuration does not actually allow all the ONUs to be composed of common devices. Further, common devices can be used as both optical modulators 73a and 73b provided that they operate over a broad band spanning the wavelength bands Ua, Da, and Ub. However, the operating band is now limited to about several 10 s of nm. Accordingly, the number of wavelengths (ONUs) is not enough to allow the optical modulators 73a and 73b to be composed of only one type of component. These light emission bands are also a limiting factor for a configuration in which an optical transceiver 75 that modulates a wavelength variable light source or a broadband light is placed in each ONU as shown in FIG. 2B or 2C.

It is an object of the present invention to provide a wavelength-division multiplex(ing) access system which allows standard and additional ONUs to conform to the same specifications and which can minimize an operating band for an optical modulator or a light emission band for an optical transmitter.

DISCLOSURE OF THE INVENTION

To accomplish the above object, the present invention provides a wavelength-division multiple access system having a center apparatus (OLT), n optical network units (ONU), and m ONUs arranged via a wavelength multi/demultiplex apparatus, the OLT and the wavelength multi/demultiplex apparatus being connected together in a multiplex section via multiplex section optical fibers, the wavelength multi/demultiplex apparatus and the ONUs being connected together in an access section via access section optical fibers, downlink optical signals from the OLT to the ONUs and uplink optical signals from the ONUs to the OLT being transmitted through the multiplex section using wavelengths assigned to the respective ONUs while multiplexing the wavelengths, the wavelength multi/demultiplex apparatus carrying out wavelength multiplexing or demultiplexing for bidirectional transmissions, characterized in that a wavelength band Da (wavelengths $\lambda d1$ to $\lambda dn$) for downlink optical signals corresponding to the n ONUs, a wavelength band Ua (wavelengths $\lambda u1$ to $\lambda un$) for uplink optical signals corresponding to the n ONUs, a wavelength band Db (wavelengths $\lambda dn+1$ to $\lambda dn+m$) for downlink optical signals corresponding to the m ONUs, and a wavelength band Ub (wavelengths $\lambda un+1$ to $\lambda un+m$) for uplink optical signals corresponding to the m ONUs are set different from one another, the wavelength bands Ua and Ub are set adjacent to each other, and the wavelength bands Ua and Da or the wavelength bands Ub and Db are set adjacent to each other, and in that each of the ONUs comprises downlink optical signal receiving means for receiving a downlink optical signal of one of the wavelengths $\lambda d1$ to $\lambda dn+m$ in the wavelength bands Da and Db which wavelength is assigned to the ONU, and uplink optical signal transmitting means for transmitting an uplink optical signal of one of the wavelengths $\lambda u1$ to $\lambda un+m$ in the wavelength bands Ua and Ub which wavelength is assigned to the ONU or an uplink optical signal within a broad band including the wavelength bands Ua and Ub.

Further, to accomplish the above object, the present invention provides an optical network unit (ONU) used in a wavelength-division multiple access system having a center apparatus (OLT), n ONUs, and m ONUs arranged via a wavelength multi/demultiplex apparatus, the OLT and the wavelength multi/demultiplex apparatus being connected together in a multiplex section via a multiplex section optical fiber, the wavelength multi/demultiplex apparatus and the ONUs being connected together in an access section via an access section optical fiber, downlink optical signals from the OLT to the ONUs and uplink optical signals from the ONUs to the OLT being transmitted through the multiplex section using wavelengths assigned to the respective ONUs while multiplexing the wavelengths, the wavelength multi/demultiplex apparatus carrying out wavelength multiplexing or demultiplexing for bidirectional transmissions, characterized in that a wavelength band Da (wavelengths $\lambda d1$ to $\lambda dn$) for downlink optical signals corresponding to the n ONUs, a wavelength band Ua (wavelengths $\lambda u1$ to $\lambda un$) for uplink optical signals corresponding to the n ONUs, a wavelength band Db (wavelengths $\lambda dn+1$ to $\lambda dn+m$) for downlink optical signals corresponding to the m ONUs, and a wavelength band Ub (wavelengths $\lambda un+1$ to $\lambda un+m$) for uplink optical signals corresponding to the m ONUs are set different from one another, the wavelength bands Ua and Ub are set adjacent to each other, and the wavelength bands Ua and Da or the wavelength bands Ub and Db are set adjacent to each other, in that a connection is made to each ONU in the access section via two access section optical fibers, in that the OLT is configured to multiplex the wavelengths of and transmit optical carriers for uplink signals in the wavelength bands Ua and Ub (wavelengths $\lambda u1$ to $\lambda un+m$) and downlink optical signals in the wavelength bands Da and Db (wavelengths $\lambda d1$ to $\lambda dn+m$) to the multiplex section optical fiber, in that the wavelength multi/demultiplex apparatus is configured to separate the optical carriers for uplink signals and downlink optical signals of the wavelengths corresponding to the ONUs from the optical carriers for uplink signals and downlink optical signals input via the multiplex section optical fiber and to output the resultant signals to the ONUs via one of the access section optical fibers, while multiplexing the uplink optical signals input through the other access section optical fiber and having the wavelengths corresponding to the ONUs to output the resultant signals to the multiplex section optical fiber, and in that each of the ONUs comprises a wavelength band demultiplexer which is characterized by separating the wavelength bands Ua and Ub for uplink optical signals from the wavelength bands Da and Db for downlink optical signals and which demultiplexes the optical carrier for the uplink signal from the downlink optical signal, the optical carrier for the uplink signal and the downlink optical signal being input via one of the access section optical fibers and having the wavelengths corresponding to the ONU, downlink optical signal receiving means for receiving a downlink optical signal of one the wavelengths $\lambda d1$ to $\lambda dn+m$ in the wavelength bands Da and Db demultiplexed by the wavelength band demultiplexer which wavelength is assigned to the ONU, and uplink optical signal transmitting means for consisting of an optical modulator modulating an optical carrier for an uplink signal of one of the wavelengths $\lambda u1$ to $\lambda un+m$ in the wavelength bands Ua and Ub demultiplexed by the wavelength band demultiplexer which wavelength is assigned to the ONU, the optical modulator then transmitting the resultant signal to the other access section optical fiber.

Further, to accomplish the above object, the present invention provides an optical network unit (ONU) used in a wavelength-division multiple access system having a center apparatus (OLT), n ONUs, and m ONUs arranged via a wavelength multi/demultiplex apparatus, the OLT and the wavelength multi/demultiplex apparatus being connected together in a multiplex section via a multiplex section optical fiber, the wavelength multi/demultiplex apparatus and the ONUs being connected together in an access section via an access section optical fiber, downlink optical signals from the OLT to the ONUs and uplink optical signals from the ONUs to the OLT being transmitted through the multiplex section using wavelengths assigned to the respective ONUs while multiplexing the wavelengths, the wavelength multi/demultiplex apparatus carrying out wavelength multiplexing or demultiplexing for bidirectional transmissions, characterized in that a wavelength band Da (wavelengths $\lambda d1$ to $\lambda dn$) for downlink optical signals corresponding to the n ONUs, a wavelength band Ua (wavelengths $\lambda u1$ to $\lambda un$) for uplink optical signals corresponding to the n ONUs, a wavelength band Db (wavelengths $\lambda dn+1$ to $\lambda dn+m$) for downlink optical signals corresponding to the m ONUs, and a wavelength band Ub (wavelengths $\lambda un+1$ to $\lambda un+m$) for uplink optical signals corresponding to the m ONUs are set different from one another, the wavelength bands Ua and Ub are set adjacent to each other, and the wavelength bands Ua and Da or the wavelength bands Ub and Db are set adjacent to each other, in that a connection is made to each ONU in the access section via one access section optical fiber, and in that each of the ONUs comprises a wavelength band demultiplexer which is characterized by separating the wavelength bands Ua and Ub for uplink optical signals from the wavelength bands for downlink optical signals and which outputs a downlink optical signal input via the access section optical fiber and having the wavelength corresponding to the ONU, to downlink optical signal receiving means, while outputting an uplink optical signal output by uplink optical signal transmitting means and having the wavelength corresponding to the ONU, to the access section optical fiber, downlink optical signal receiving means for receiving a downlink optical signal of one of the wavelengths $\lambda d1$ to $\lambda dn+m$ in the wavelength bands Da and Db which wavelength is assigned to the ONU, and uplink optical signal transmitting means for transmitting an uplink optical signal of one of the wavelengths $\lambda u1$ to $\lambda un+m$ in the wavelength bands Ua and Ub which wavelength is assigned to the ONU or an uplink optical signal within a broad band including the wavelength bands Ua and Ub.

BRIEF DESCRIPTION OF THE DRAWINGS

FIG. 6 is a diagram showing the characteristics of a WDM coupler and an optical modulator according to a first embodiment;

BEST MODE FOR CARRYING OUR THE INVENTION

First Embodiment

Figure 5A:
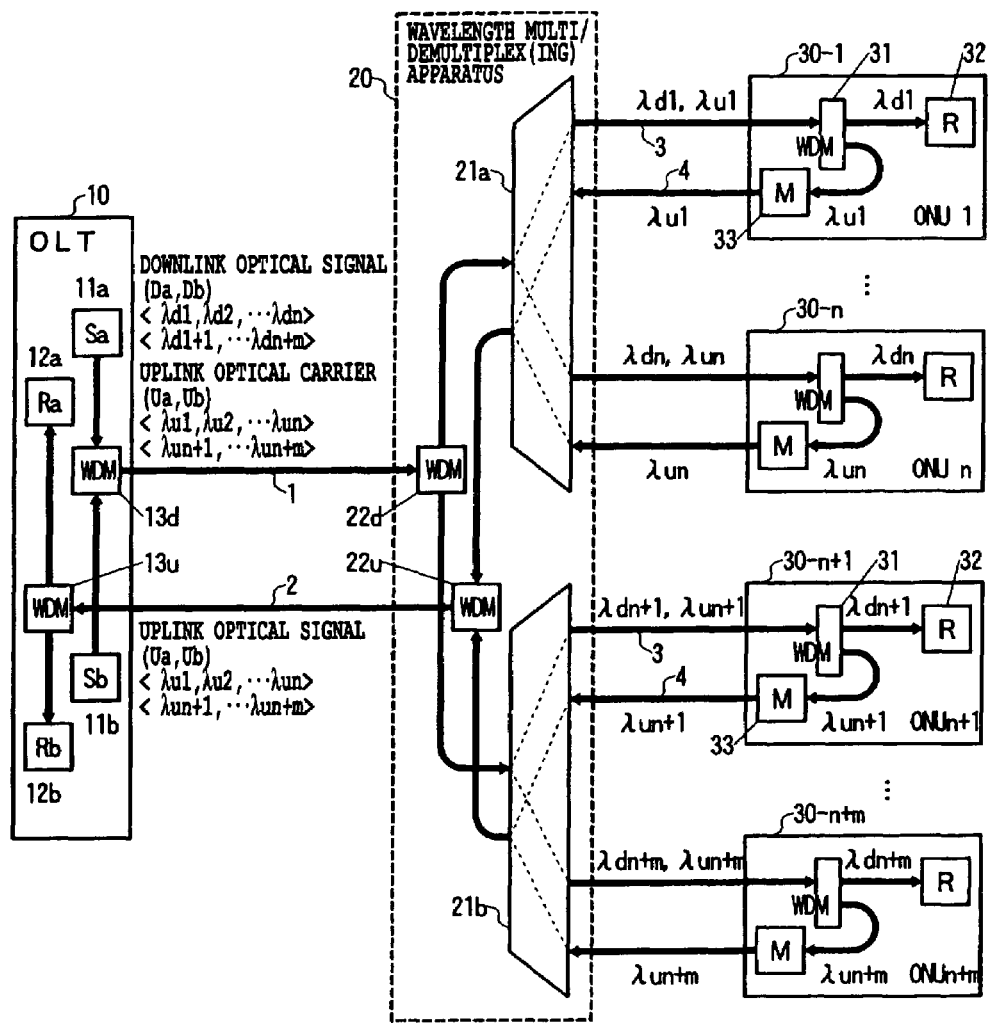
FIGS. 5A and 5B are diagrams showing a first embodiment of a wavelength-division multiplex(ing) access system according to the present invention.
Figure 5B:
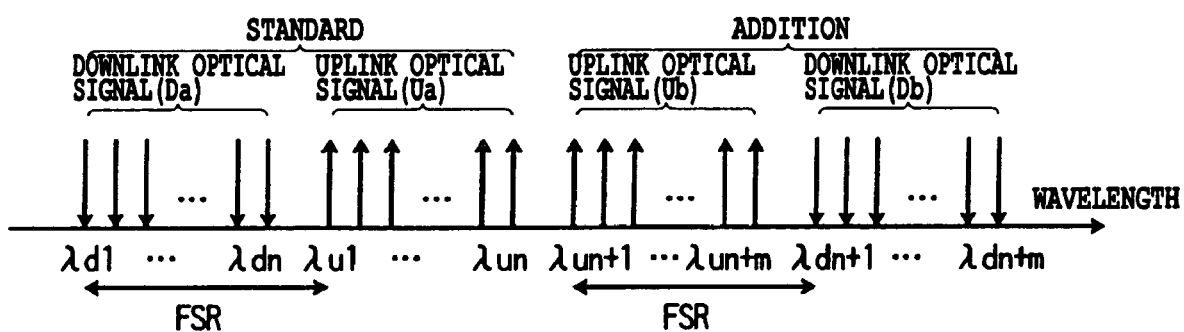

FIGS. 5A and 5B show a first embodiment of a wavelength-division multiplex(ing) access system according to the present invention. In FIG. 5A, a center apparatus (OLT) 10 and a wavelength multi/demultiplex(ing) apparatus 10 are connected together in a multiplex section via multiplex section optical fibers 1 and 2. The wavelength multi/demultiplex(ing) apparatus 20 and a plurality of optical network units (ONUs) 30-1 to 30-n are connected together in an access section via access section optical fibers 3 and 4. In this case, the ONUs 30-1 to 30-n are standard, while the ONUs 30-n+1 to 30-n+m are additional.

According to the present invention, for the standard ONUs 30-1 to 30-n+m, wavelengths $\lambda d1$ to $\lambda dn$ in a wavelength band Da are assigned to downlink signals. Wavelengths $\lambda u1$ to $\lambda un$ in a wavelength band Ua are assigned to uplink signals. Further, for the additional ONUs 30-n+1 to 30-n+m, wavelengths $\lambda dn+1$ to $\lambda dn+m$ in a wavelength band Db are assigned to downlink signals. Wavelengths $\lambda un+1$ to $\lambda un+m$ in a wavelength band Ub are assigned to uplink signals. Moreover, the present invention is characterized in that the wavelength bands Ua and Ub are set adjacent to each other. In the example of the present embodiment, the wavelength bands Da, Ua, Ub, and Db are assigned on the wavelength axis in this order. The order may be reversed.

The OLT 10 comprises a standard transmission section (Sa) 11a that multiplexes the wavelengths of and transmits downlink optical signals in the wavelength band Da (λd1 to λdn) and optical carriers for uplink signals in the wavelength band Ua (λu1 to λun). The OLT 10 also comprises an additional transmission section (Sb) 11b that multiplexes the wavelengths of and transmits downlink optical signals in the wavelength band Db (λdn+1 to λdn+m) and optical carriers for uplink signals in the wavelength band Ub (λun+1 to λun+m). Moreover, the OLT 10 comprises a standard reception section (Ra) 12a that receives uplink optical signals in the wavelength band Ua (λu1 to λun) and an additional reception section (Rb) 12b that receives uplink optical signals in the wavelength band Ub (λun+1 to λun+m).

A WDM coupler 13d multiplexes the wavelengths of standard and additional downlink optical signals and optical carriers for uplink signals transmitted by the standard transmission section 11a and the additional transmission section 11b. The WDM coupler 13d then transmits the resultant signals to the wavelength multi/demultiplex(ing) apparatus 20 via the multiple section optical fiber 1. The wavelength multi/demultiplex(ing) apparatus 20 uses a WDM coupler 22d to separate the standard wavelength bands Da and Ua from the additional wavelength bands Db and Ub. The wavelength multi/demultiplex(ing) apparatus 20 uses wavelength multi/demultiplexers 21a and 21b to divide the wavelength bands separated, into downlink optical signals and optical carriers for uplink signals of the respective wavelengths. Pairs of downlink optical signals of the wavelengths λd1 to λdn and optical carriers for uplink signals of the wavelengths λu1 to λun which have been divided by the wavelength multi/demultiplexer 21a are transmitted to the corresponding ONUs 30-1 to 30-n via the access section optical fiber 3. Pairs of downlink optical signals of the wavelengths λdn+1 to λdn+m and optical carriers for uplink signals of the wavelengths λun+1 to λun+m which have been divided by the AWG 61b are transmitted to the corresponding ONUs 30-n+1 to 30-n+m via the access section optical fiber 3.

WDM couplers 31 of the standard ONUs 30-1 to 30-n+m have a common transmission characteristic that they separate the wavelength bands Da and Db for downlink signals from the wavelength bands Ua and Ub for uplink signals. Optical modulators 33 are equally characterized by modulating optical carriers of the adjacent wavelength bands Ua and Ub. Each of the ONUs uses an optical receiver (R) to receive a downlink optical signal of the wavelength within the wavelength bands Da and Db demultiplexed by the WDM coupler 31 which wavelength is assigned to the ONU. Each ONU uses an optical modulator (M) 33 to modulate an optical carrier for an uplink signal of the wavelength within the wavelength bands Ua and Ub which is assigned to the ONU to obtain an uplink optical signal and then transmits the signal. The uplink optical signal transmitted by each ONU is transmitted to the wavelength multi/demultiplexer 21a or 21b of the wavelength multi/demultiplex(ing) apparatus 20 via the access section optical fiber 4. A WDM coupler 22u demultiplexes the standard and additional uplink optical signals wavelength-multiplexed by the wavelength multi/demultiplexers 21a and 21b. The WDM coupler 22u then transmits the resultant signals to the OLT 10 via the uplink multiple section optical fiber 2. The OLT 10 uses a WDM coupler 13u to separate the standard wavelength band Ua from additional wavelength band Ub. The standard and additional reception sections 12a and 12b receive the wavelength bands separated.

FIG. 6 shows the characteristics of the WDM coupler and optical modulator according to the first embodiment. As shown in FIG. 6A, according to the present embodiment, the wavelength bands Da, Ua, Ub, and Db are assigned on the wavelength axis in this order. The transmission characteristics of the WDM couplers 13d and 13u of the OLT 10 and of the WDM couplers 22d and 22u of the wavelength multi/demultiplex(ing) apparatus 20 may be such that they can merge or separate the standard wavelength bands Ua and Da with or from the additional wavelength bands Ub and Db as shown in FIG. 6B. Accordingly, all of these components may conform to the same specifications. In this case, the standard transmission sections 11a and 12a are connected to reflection ports of the WDM couplers 13d and 13u. The additional transmission sections 11b and 12b are connected to transmission ports of the WDM couplers 13d and 13u. The standard wavelength multi/demultiplexer 21a is connected to the reflection port of each of the WDM couplers 22d and 22u. The additional wavelength multi/demultiplexer 21b is connected to the transmission port of each of the WDM couplers 22d and 22u.

Moreover, the WDM couplers 31 of the standard ONUs 30-1 to 30-n and additional ONUs 30-n+1 to 30-n-m may have a transmission characteristic that they separate the wavelength bands Da and Db for downlink optical signals from the wavelength bands Ua and Ub for optical carriers for uplink signals as shown in FIG. 6C. In other words, the wavelength bands Ua and Ub of optical carriers for uplink signals (uplink optical signals) are set adjacent to each other. Thus, the WDM couplers 31 may have a transmission characteristic that they demultiplex and send optical carriers for uplink signals in the wavelength bands Ua and Ub to their transmission ports and downlink optical carriers in the wavelength bands Da and Db to their reflection ports. Thus, common devices can be used as the WDM couplers 31 of both standard and additional ONUs. Likewise, for the optical modulators 33 of the standard and additional ONUs, the wavelength bands Ua and Ub for optical carriers for uplink signals are set adjacent to each other. Thus, the optical modulators 33 may be composed of modulators having a continuous operating band as shown in FIG. 6D and conforming to the same specifications.

For example, if the wavelength bands Da, Ua, Ub, and Db are set at 1,525 to 1,545 nm, 1,545 to 1,565 nm, 1,570 to 1,590 nm, and 1,590 to 1,610 nm, respectively, the optical modulators 33 of the standard and additional ONUs may have an operating band of about 45 nm between 1545 and 1590 nm. This allows the ONUs including the WDM couplers 31 to be composed of one type of devices.

Further, the standard downlink optical signals and uplink optical signals (optical carriers for uplink signals) use a wavelength band of 1,525 to 1,565 nm. The additional downlink optical signals and uplink optical signals (optical carriers for uplink signals) use a wavelength band of 1,570 to 1,610 nm. Therefore, for example, an erbium-doped fiber amplifier or a gain-shifted erbium-doped fiber amplifier (gain-shifted EDFA) can be used in wavelength multi/demultiplex(ing) apparatus 20 to amplify the whole of each wavelength band at a time.

Second Embodiment

Figure 7:
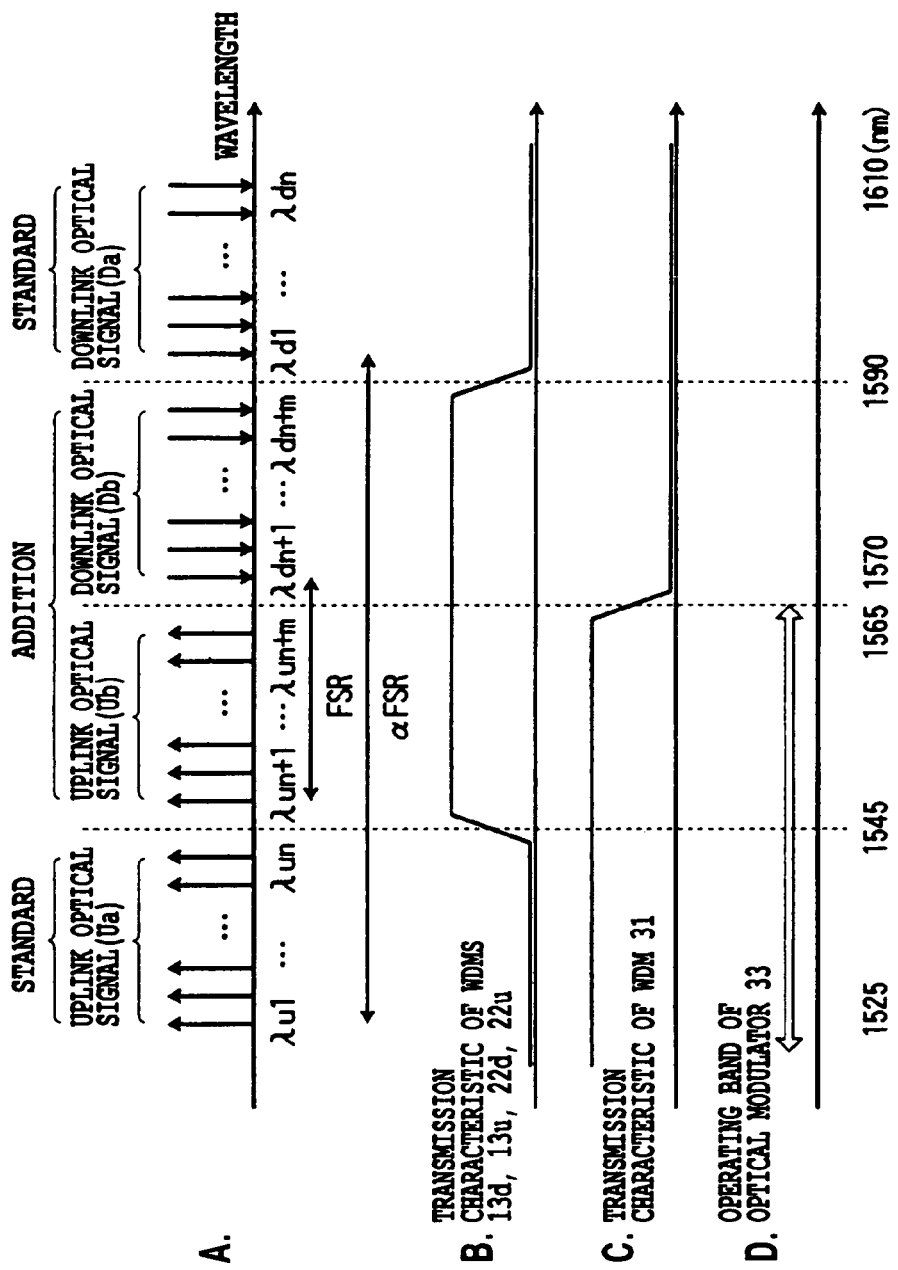
FIG. 7 is a diagram showing the characteristics of a WDM coupler and an optical modulator according to a second embodiment.

FIG. 7 shows the characteristics of a WDM coupler and an optical modulator according to a second embodiment. The configuration of the second embodiment of the wavelength-division multiplex(ing) access system according to the present invention is similar to that of the first embodiment, shown in FIG. 5A. In the example of the present embodiment, the wavelength bands Da, Ua, Ub, and Db are assigned on the wavelength axis in this order. The order may be reversed.

The transmission characteristics of the WDM couplers 13d and 13u of the OLT 10 and of the WDM couplers 22d and 22u of the wavelength multi/demultiplex(ing) apparatus 20 may be such that they can merge or separate the standard wavelength bands Ua and Da with or from the additional wavelength bands Ub and Db as shown in FIG. 7B. Accordingly, the WDM couplers 13d, 13u, 22D, and 22u may all conform to the same specifications. In this case, the standard transmission sections 11a and 12a are connected to reflection ports of the WDM couplers 13d and 13u. The additional transmission sections 11b and 12b are connected to transmission ports of the WDM couplers 13d and 13u. The standard wavelength multi/demultiplexer 21a is connected to the reflection port of each of the WDM couplers 22d and 22u. The additional wavelength multi/demultiplexer 21b is connected to the transmission port of each of the WDM couplers 22d and 22u.

Moreover, the WDM couplers 31 of the standard ONUs 30-1 to 30-n and additional ONUs 30-n+1 to 30-n-m may have a transmission characteristic that they separate the wavelength bands Da and Db for downlink optical signals from the wavelength bands Ua and Ub for optical carriers for uplink signals as shown in FIG. 7C. In other words, the wavelength bands Ua and Ub of optical carriers for uplink signals (uplink optical signals) are set adjacent to each other. Thus, the WDM couplers 31 may have a transmission characteristic that they demultiplex and send optical carriers for uplink signals in the wavelength bands Ua and Ub to their transmission ports and downlink optical carriers in the wavelength bands Da and Db into their reflection ports. Thus, common devices can be used as the WDM couplers 31 of both standard and additional ONUs. Likewise, for the optical modulators 33 of the standard and additional ONUs, the wavelength bands Ua and Ub for optical carriers for uplink signals are set adjacent to each other. Thus, the optical modulators 33 may be composed of modulators having a continuous operating band as shown in FIG. 7D and conforming to the same specifications.

For example, if the wavelength bands Da, Ua, Ub, and Db are set at 1,525 to 1,545 nm, 1,545 to 1,565 nm, 1,570 to 1,590 nm, and 1,590 to 1,610 nm, respectively, the optical modulators 33 of the standard and additional ONUs may have an operating band of about 40 nm between 1525 and 1565 nm. This allows the ONUs including the WDM couplers 31 to be composed of one type of devices.

Third Embodiment

Figure 8:
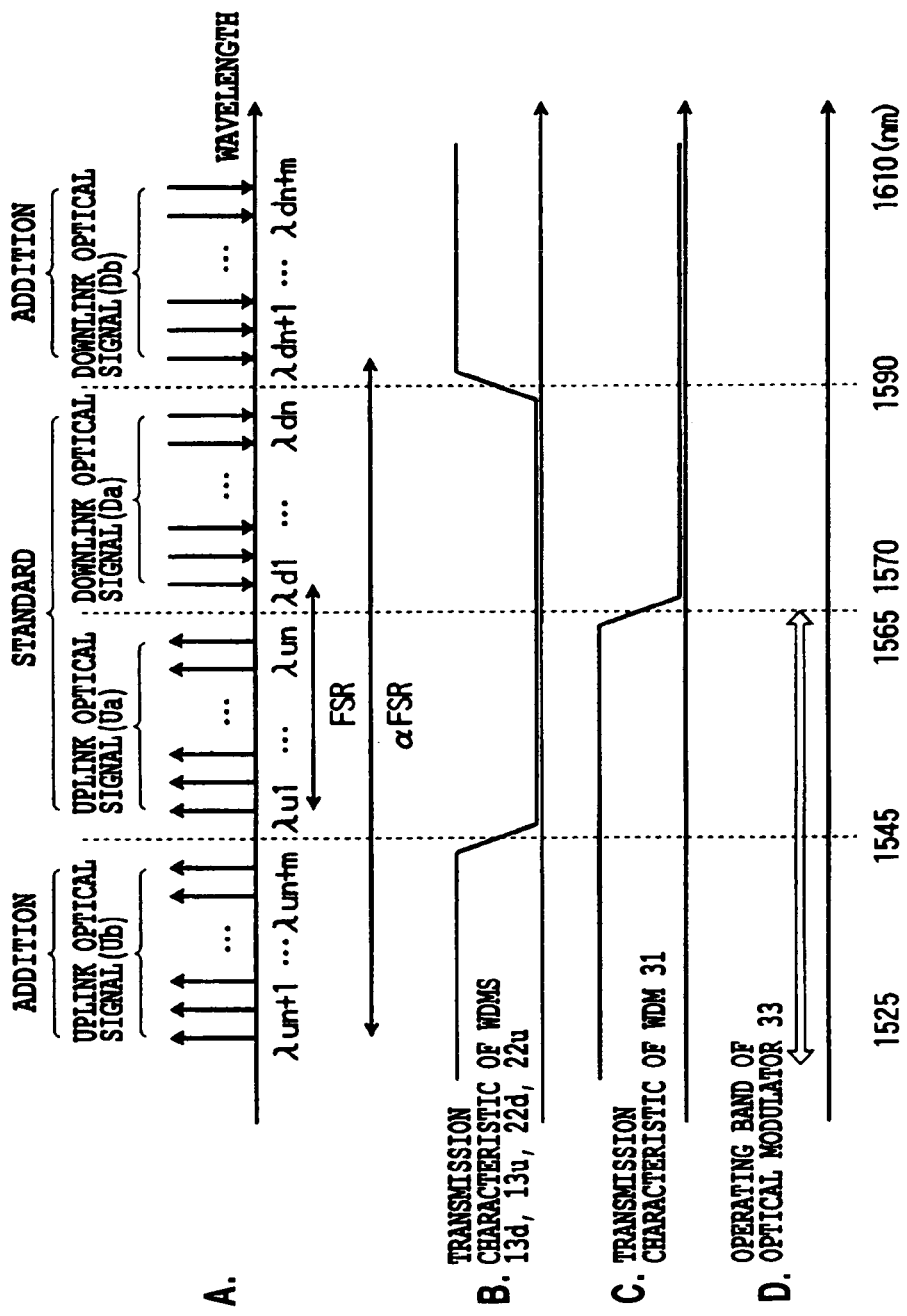
FIG. 8 is a diagram showing the characteristics of a WDM coupler and an optical modulator according to a third embodiment.

FIG. 8 shows the characteristics of a WDM coupler and an optical modulator according to a third embodiment. The configuration of the third embodiment of the wavelength-division multiplex(ing) access system according to the present invention is similar to that of the first embodiment, shown in FIG. 5A. In the example of the present embodiment, the wavelength bands Da, Ua, Ub, and Db are assigned on the wavelength axis in this order. The order may be reversed.

The transmission characteristics of the WDM couplers 13d and 13u of the OLT 10 and of the WDM couplers 22d and 22u of the wavelength multi/demultiplex(ing) apparatus 20 may be such that they can merge or separate the standard wavelength bands Ua and Da with or from the additional wavelength bands Ub and Db as shown in FIG. 8B. Accordingly, the WDM couplers 13d, 13u, 22D, and 22u may all conform to the same specifications. In this case, the standard transmission sections 11a and 12a are connected to reflection ports of the WDM couplers 13d and 13u. The additional transmission sections 11b and 12b are connected to transmission ports of the WDM couplers 13d and 13u. The standard wavelength multi/demultiplexer 21a is connected to the reflection port of each of the WDM couplers 22d and 22u. The additional wavelength multi/demultiplexer 21b is connected to the transmission port of each of the WDM couplers 22d and 22u.

Moreover, the WDM couplers 31 of the standard ONUs 30-1 to 30-n and additional ONUs 30-n+1 to 30-n-m may have a transmission characteristic that they separate the wavelength bands Da and Db for downlink optical signals from the wavelength bands Ua and Ub for optical carriers for uplink signals as shown in FIG. 8C. In other words, the wavelength bands Ua and Ub of optical carriers for uplink signals (uplink optical signals) are set adjacent to each other. Thus, the WDM couplers 31 may have a transmission characteristic that they demultiplex and send optical carriers for uplink signals in the wavelength bands Ua and Ub to their transmission ports and downlink optical carriers in the wavelength bands Da and Db to their reflection ports. Thus, common devices can be used as the WDM couplers 31 of both standard and additional ONUs. Likewise, for the optical modulators 33 of the standard and additional ONUs, the wavelength bands Ua and Ub for optical carriers for uplink signals are set adjacent to each other. Thus, the optical modulators 33 may be composed of modulators having a continuous operating band as shown in FIG. 8D and conforming to the same specifications.

For example, if the wavelength bands Da, Ua, Ub, and Db are set at 1,525 to 1,545 nm, 1,545 to 1,565 nm, 1,570 to 1,590 nm, and 1,590 to 1,610 nm, respectively, the optical modulators 33 of the standard and additional ONUs may have an operating band of about 40 nm between 1525 and 1565 nm. This allows the ONUs including the WDM couplers 31 to be composed of one type of devices.

(Example of Configuration of Wavelength Multi/Demultiplexer 21a, 21b)

The wavelength multi/demultiplexer 21a of the wavelength multi/demultiplex(ing) apparatus 20, shown in FIGS. 5A and 5B are assumed to be an AWG that demultiplexes a pair of a downlink optical signal of the wavelength $\lambda d1$ to $\lambda dm$ and an optical carrier for an uplink signal of the wavelength $\lambda u1$ to $\lambda un$ into the same port. The spacing between the paired signals is set equal to the FSR (or its integral multiple) as shown in FIG. 6A. However, the multiplexing of uplink optical signals of the wavelengths $\lambda u1$ to $\lambda un$ does not necessarily require the functions of the AWG. It is possible to use a configuration in which the AWG 23 is used to separate downlink optical signals from optical carriers for uplink signals and in which a multiplexer 24 is used to multiplex optical carriers for uplink signals as shown in FIG. 9.

Figure 9:
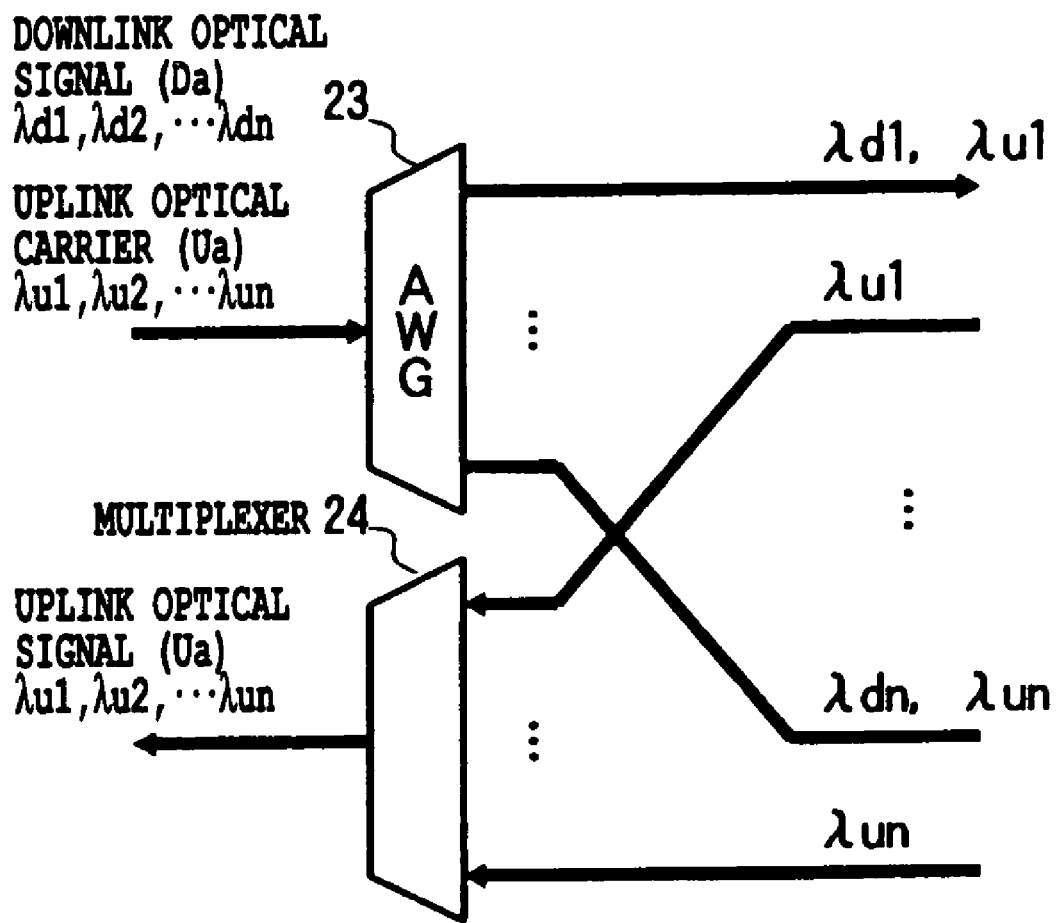
FIG. 9 is a diagram showing another example of the configuration of a wavelength multi/demultiplexer 21a according to the first embodiment.
Figure 10:
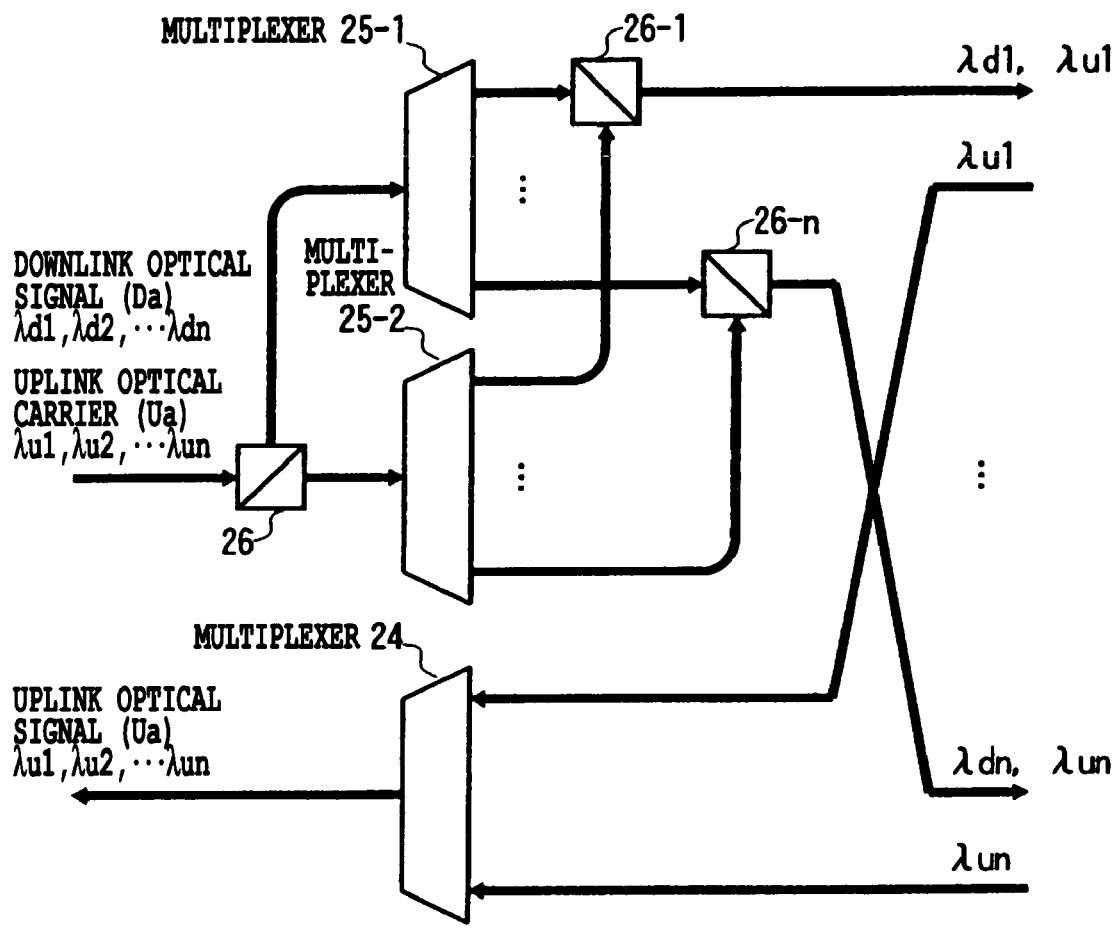
FIG. 10 is a diagram showing another example of the configuration of the wavelength multi/demultiplexer 21a according to the first embodiment.

As shown in FIG. 10, a demultiplexer 25-1 that demultiplexes downlink optical signals of the wavelengths $\lambda d1$ to $\lambda dn$ and a demultiplexer 25-2 that demultiplexes optical carriers for uplink signals of the wavelengths $\lambda u1$ to $\lambda un$ may be used instead of the AWG 23 in FIG. 9. A WDM coupler 26 may then separates downlink optical signals in the wavelength band Da from optical carriers for uplink signals in the wavelength band Ua. The WDM coupler 26 may then input the signals to the demultiplexers 25-1 and 25-2. WDM couplers 26-1 to 26-n may then multiplex the pairs of the downlink optical signals and optical carriers for uplink signals. This configuration does not require the FSR of the AWG to be set for the wavelength spacing between the paired downlink optical signal and uplink optical carrier corresponding to each ONU. The wavelength spacing may be set at an arbitrary value.

The configuration of the wavelength multi/demultiplexer 21b is similar to that of the wavelength multi/demultiplexer 21a, shown above. In a configuration in which an AWG is used as the wavelength multi/demultiplexer, the second embodiment has a larger wavelength spacing between the downlink optical signal and uplink optical carrier corresponding to each ONU as shown in FIG. 7A. Further, in a configuration in which an AWG is used as the wavelength multi/demultiplexer, the third embodiment has a larger wavelength spacing between the downlink optical signal and uplink optical carrier corresponding to each additional ONU as shown in FIG. 8A. Thus, the wavelength multi/demultiplexers 21a and 21b must be composed of AWGs according to each of the second and third embodiments.

Fourth and Fifth Embodiments

According to the first embodiment, optical carriers for uplink signals supplied by the OLT 10 to each ONU are transmitted while multiplexing the wavelengths of the carriers. The wavelength multi/demultiplex(ing) apparatus 20 then demultiplexes the optical carriers for uplink signals of the respective wavelengths and supplies the resultant signals to the corresponding ONUs. Each of the ONUs modulates the optical carrier for the uplink signal to obtain an uplink optical signal and then transmits the signal. A fourth and fifth embodiments shown below have optical transmitters that transmit uplink optical signals to the respective ONUs. However, the fourth and fifth embodiments assign the wavelengths as shown in the first to third embodiments. The fourth and fifth embodiments thus allow the optical transmitters to operate in a common operating band. These embodiments also allow common devices to be used as both standard and additional ONUs.

Figure 11A:
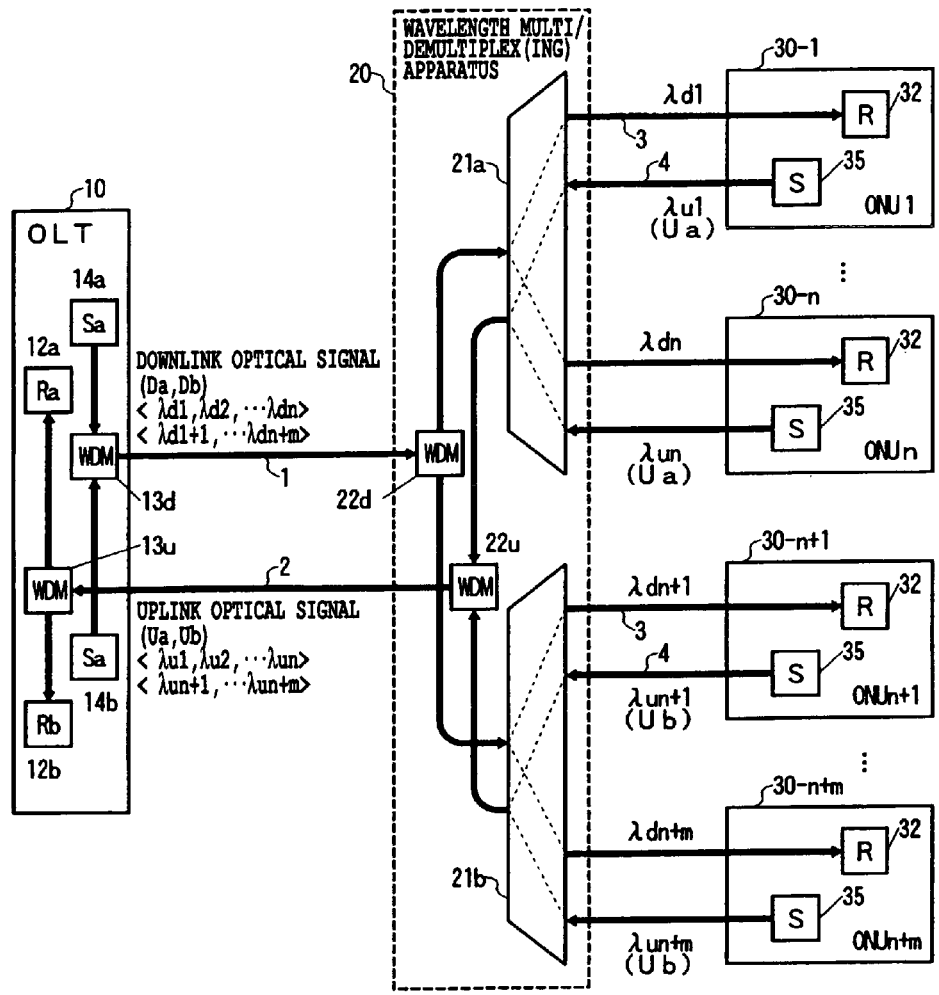
FIGS. 11A and 11B are diagrams showing a fourth embodiment of a wavelength-division multiplex(ing) access system according to the present invention.
Figure 11B:
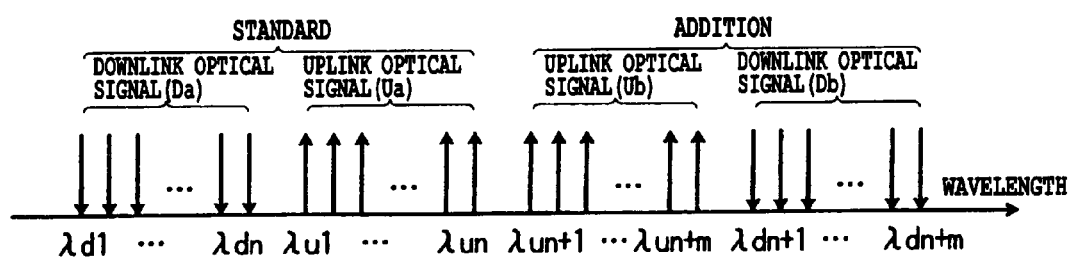

FIGS. 11A and 11B show a fourth embodiment of a wavelength-division multiplex(ing) access system according to the present invention. The OLT 10 according to the present embodiment comprises a standard transmission section (Sa) 14a that multiplexes the wavelengths of and transmits downlink optical signals in the wavelength band Da ($\lambda d1$ to $\lambda dn$) and an additional transmission section (Sb) 14b that multiplexes the wavelengths and transmits downlink optical signals in the wavelength band Db ($\lambda dn+1$ to $\lambda dn+m$). Further, the OLT 10 comprises a standard reception section (Ra) 12a that receives uplink optical signals in the wavelength band Ua ($\lambda u1$ to $\lambda un$) and an additional reception section (Rb) 12b that receives uplink optical signals in the wavelength band Ub ($\lambda un+1$ to $\lambda un+m$).

The WDM coupler 13d multiplexes of the wavelengths of standard and additional downlink optical signals transmitted by the standard and additional transmission sections 14a and 14b. The WDM coupler 13d then transmits the resultant signals to the wavelength multi/demultiplex(ing) apparatus 20 via the multiple section optical fiber 1. The wavelength multi/demultiplex(ing) apparatus 20 uses the WDM coupler 22d to separate the standard wavelength band Da from the additional wavelength band Db. The wavelength multi/demultiplex(ing) apparatus 20 uses the wavelength multi/demultiplexers 21a and 21b to demultiplex downlink optical signals of the respective wavelengths. The downlink optical signals of the wavelengths $\lambda d1$ to $\lambda dn$ demultiplexed by the wavelength multi/demultiplexer 21a are transmitted to the corresponding ONUs 30-1 to 30-n via the access section optical fiber 3. The downlink optical signals of the wavelengths $\lambda dn+1$ to $\lambda dn+m$ demultiplexed by the wavelength multi/demultiplexer 21b are transmitted to the corresponding ONUs 30-n+1 to 30-n+m via the access section optical fiber 3.

Each of the ONUs 30-1 to 30-n+m uses an optical receiver (R) 32 to receive a downlink optical signal of the wavelength within the wavelength bands Da and Db which is assigned to the ONU. Each of the ONUs 30-1 to 30-n+m uses an optical transmitter (S) 35 to transmit an uplink optical signal of the wavelength within the wavelength bands Ua and Ub which is assigned to the ONU. Uplink optical signals transmitted by the ONUs are transmitted to the wavelength multi/demultiplexer 21a and 21b of the wavelength multi/demultiplex(ing) apparatus 20 via the access section optical fiber 4. Then, the WDM coupler 22u multiplexes the standard and additional uplink optical signals wavelength-multiplexed by the wavelength multi/demultiplexer 21a and 21b. The WDM coupler 22u transmits the resultant signals to the OLT 10 via the multiplex section optical fiber 2. The OLT 10 uses the WDM coupler 13u to separate the uplink optical signals into the standard wavelength band Ua and the additional wavelength band Ub. The standard and additional reception sections 12a and 12b receive the wavelength bands Ua and Ub, respectively.

In the present embodiment, the WDM coupler 13d of the OLT 10 and the WDM coupler 22d of the wavelength multi/demultiplex(ing) apparatus 20 merge and separate the standard wavelength band Da with and from the additional wavelength band Dn. The WDM coupler 13u of the OLT 10 and the WDM coupler 22u of the wavelength multi/demultiplex(ing) apparatus 20 merge and separate the standard wavelength band Ua with and from the additional wavelength band Ub. Thus, the WDM couplers 13d and 13u, 22d, and 22u may all have a transmission characteristic shown in FIG. 6B, 7B, or 8B. The wavelength multi/demultiplexer 21a of the wavelength multi/demultiplex(ing) apparatus 20 uses a single element (AWG) to provide a function for demultiplexing downlink optical signals in the standard wavelength band Da and multiplexing uplink optical signals in the standard wavelength band Ua. However, the multiplexing and demultiplexing may be individually carried out by a multiplexer and a demultiplexer. This also applies to the wavelength multi/demultiplexer 21b.

Moreover, the optical transmitter 35 of each ONU according to the present embodiment sets the standard and additional wavelengths Ua and Ub adjacent to each other. Accordingly, the optical transmitters 35 may have the continuous operating band shown in FIG. 6D, 7D, or 8D and conform to the same specifications. For example, if the wavelength bands Da, Ua, Ub, and Db are set at 1,525 to 1,545 nm, 1,545 to 1,565 nm, 1,570 to 1,590 nm, and 1,590 to 1,610 nm, respectively, the ONUs can transmit optical carriers for uplink signals of the respective set wavelengths by using, as the optical transmitters 35, wavelength variable light sources operating in an operating band of 1,545 to 1,590 nm. Alternatively, the optical transmitters 35 may modulate and transmit broadband light containing the wavelength bands Ua and Ub. Then, the wavelength multi/demultiplexers 21a and 21b spectrum-slices the light transmitted.

Figure 12A:
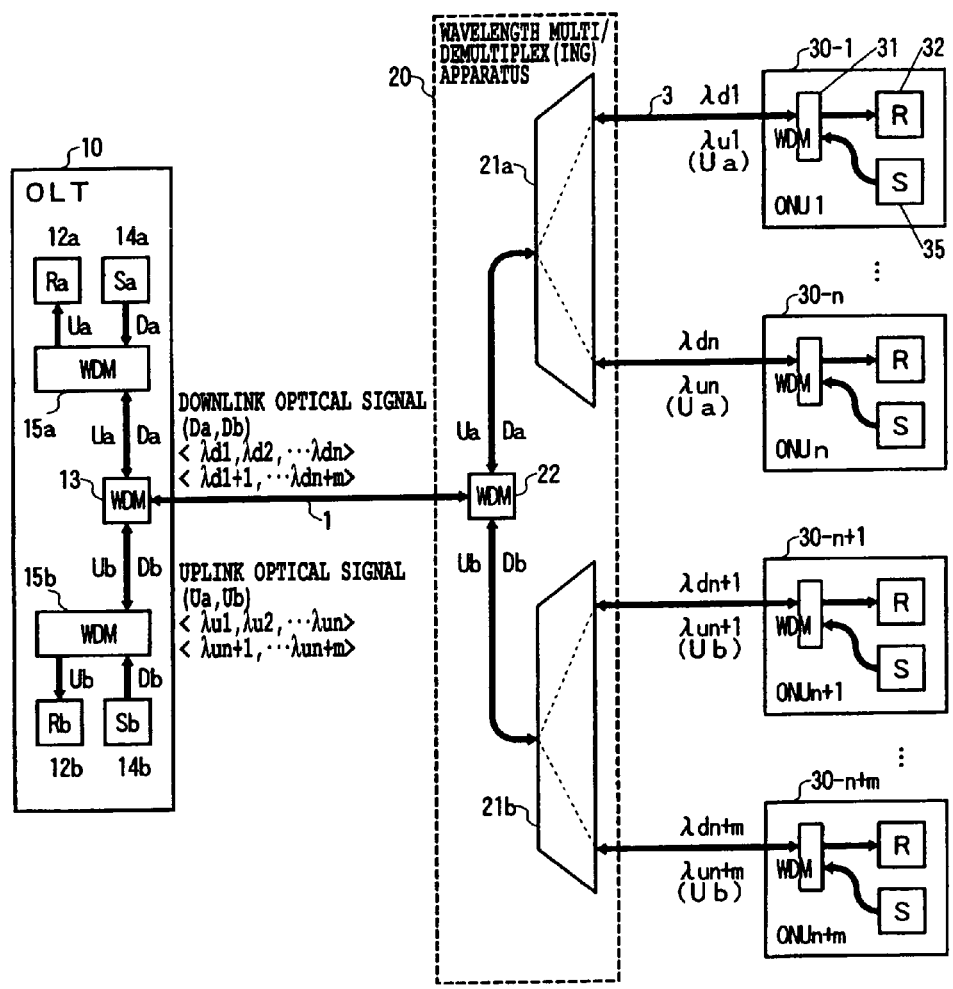
FIGS. 12A and 12B are diagrams showing a fifth embodiment of a wavelength-division multiplex(ing) access system according to the present invention.
Figure 12B:
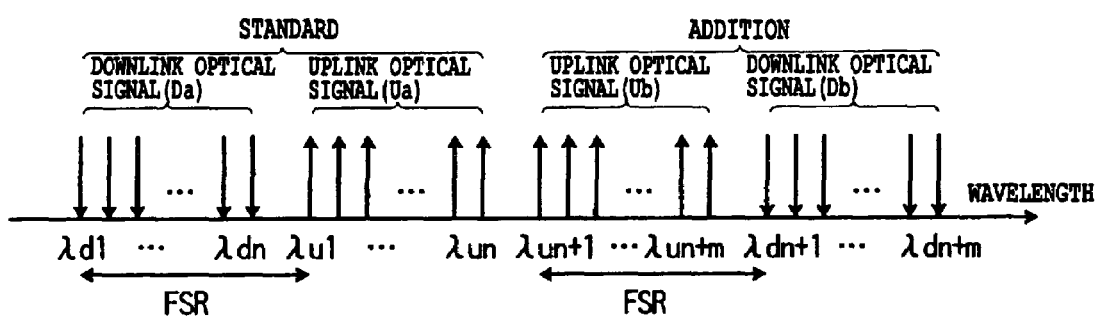

FIGS. 12A and 12B show a fifth embodiment of a wavelength-division multiplex(ing) access system according to the present invention. The present embodiment is characterized in that the OLT 1 and the wavelength multi/demultiplex(ing) apparatus 20 are connected together in the multiplex section via the single multiplex section optical fiber 1 and in that the wavelength multi/demultiplex(ing) apparatus 20 and each ONU are connected together in the access section via the single access section optical fiber 3.

In the present embodiment, the WDM coupler 13 of the OLT 10 and the WDM coupler 22 of the wavelength multi/demultiplex(ing) apparatus 20 merge and separate the standard wavelength bands Da and Ua with and from the additional wavelength bands Db and Ub. Thus, the WDM couplers 13 and 22 may have the transmission characteristic shown in FIG. 6B, 7B, or 8C. Each ONU also comprises a WDM coupler 31 that separates the wavelength band Da, Db for downlink optical signals from the wavelength band Ua, Ub for uplink optical signals. The WDM coupler may have the transmission characteristic shown in FIG. 6C, 7C, or 8C. The OLT 10 also comprises a WDM coupler 15a that separates the wavelength band Da for standard downlink optical signals from the wavelength band Ua for standard uplink optical signals which bands are merged or separated by the WDM coupler 13. Moreover, the OLT 10 further comprises a WDM coupler 15b that separates the wavelength band Db for additional downlink optical signals from the wavelength band Ub for additional uplink optical signals. These WDM couplers may have the transmission characteristic shown in FIG. 6C, 7C, or 8C. In the OLT 10, the functions of the WDM coupler 13 may be replaced with the functions of the WDM couplers 15a and 15b.

Other Embodiments

In the description of the above embodiments, it is assumed that m ONUs are added to n standard ONUs. However, the above embodiments also apply to the case in which n+m ONUs are divided into a group of n ONUs and a group of m ONUs so that one of the groups is used for the standard, while the other is used for the addition. That is, a characteristic of the present invention is a manner of arranging standard and additional wavelength bands if each of the wavelength band U for uplink optical signals and the wavelength band D for downlink optical signals is divided into two.

Figure 1A:
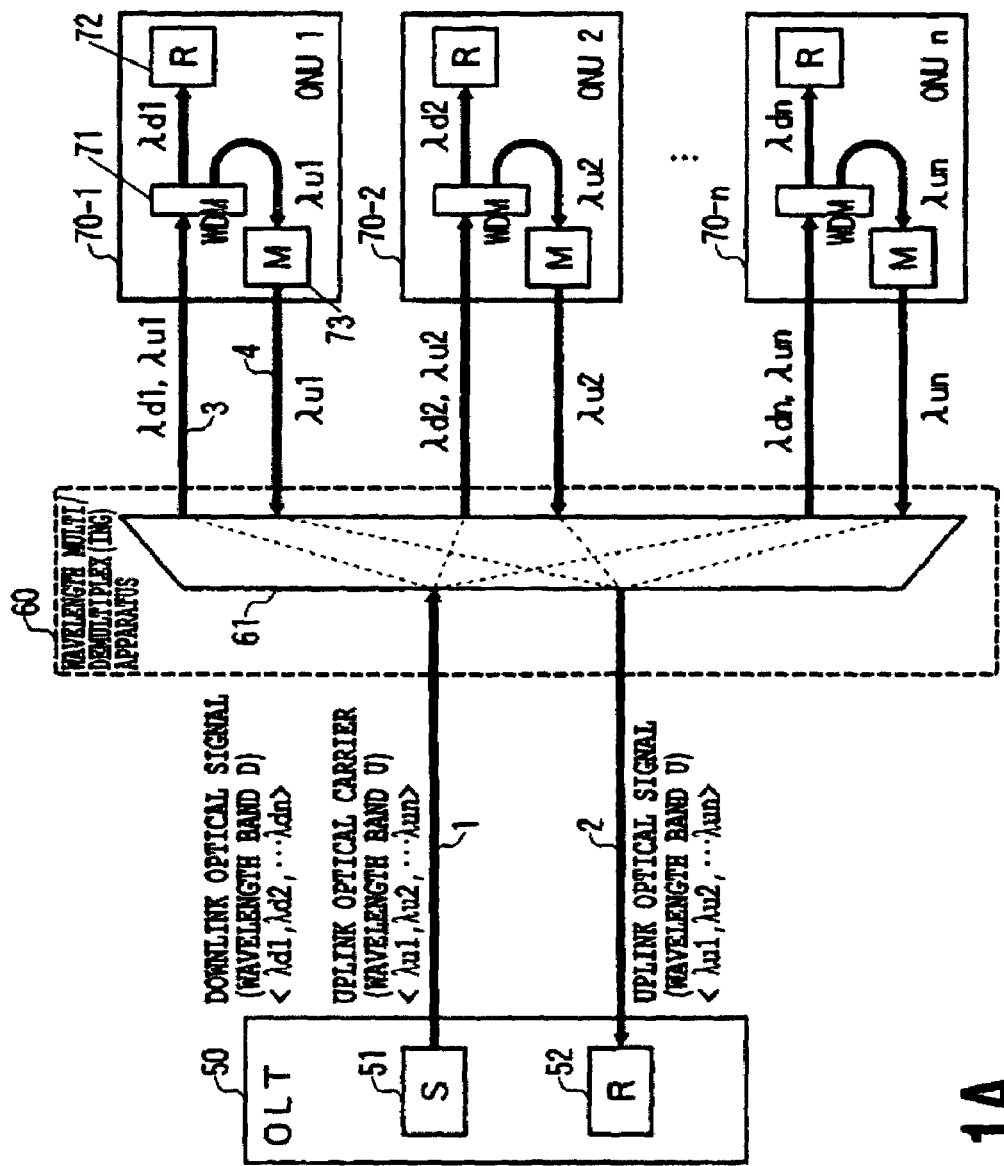
FIGS. 1A to 1C are diagrams showing an example of the configuration of a conventional optical wavelength-division multiplex(ing) access system.
Figure 1B:
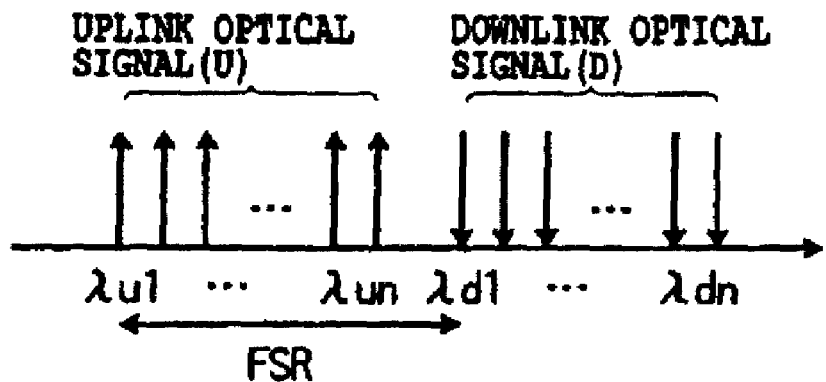
Figure 1C:
Figure 2A:
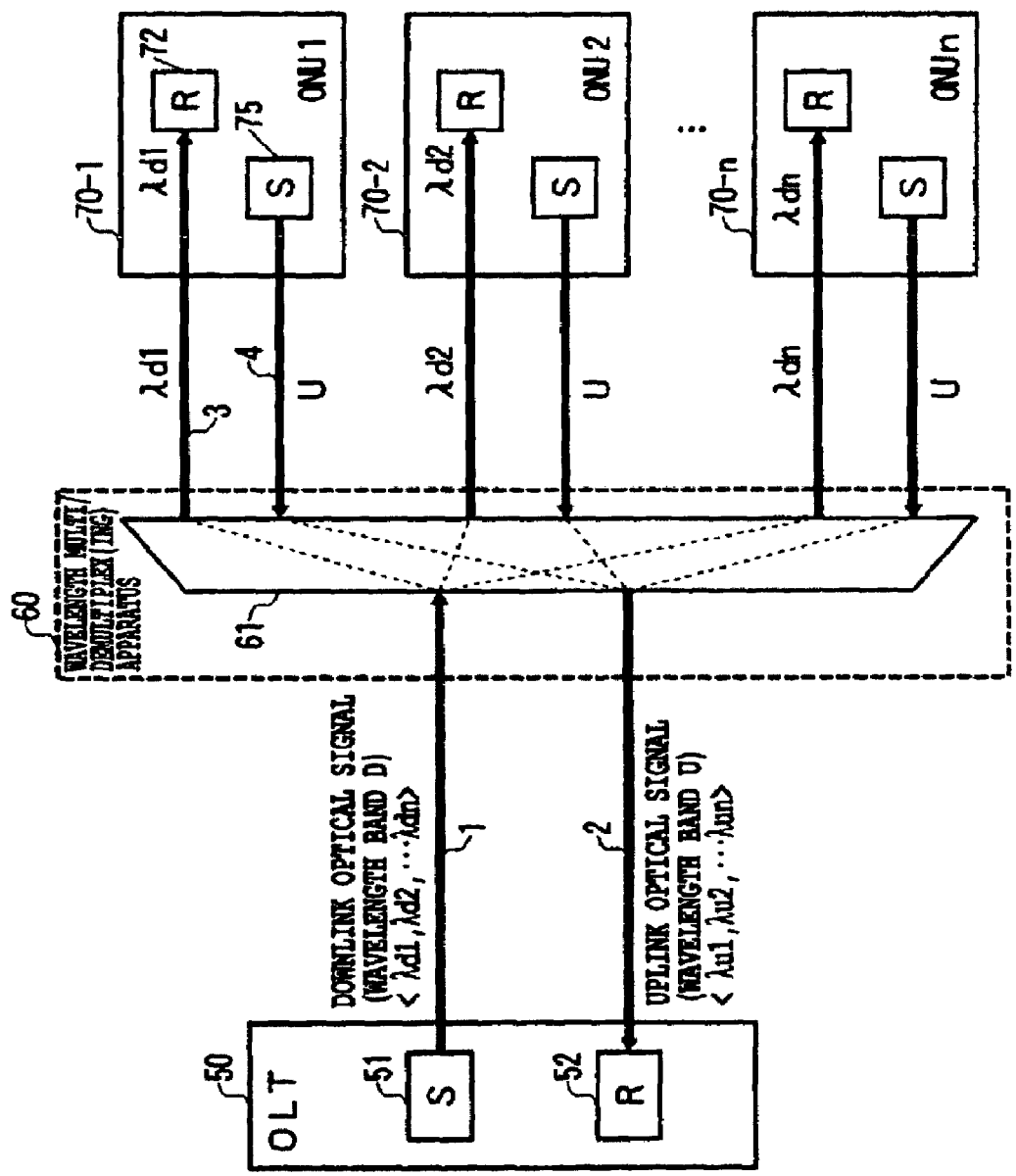
FIGS. 2A to 2C are diagrams showing an example of the configuration of the conventional optical wavelength-division multiplex(ing) access system.
Figure 2B:
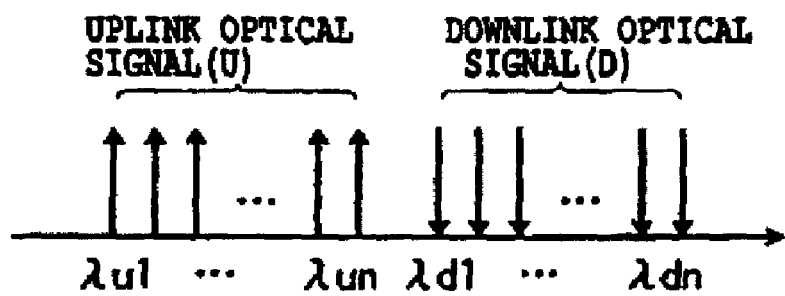
Figure 2C:
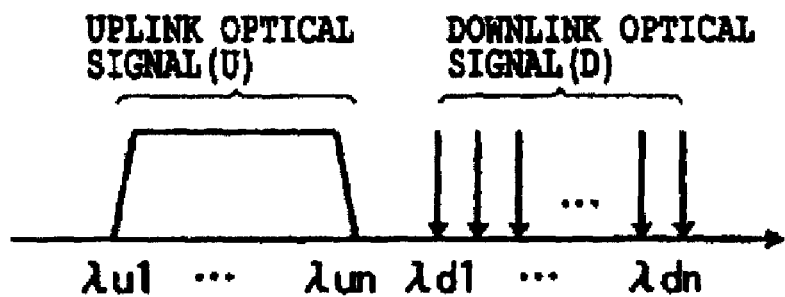
Figure 3:
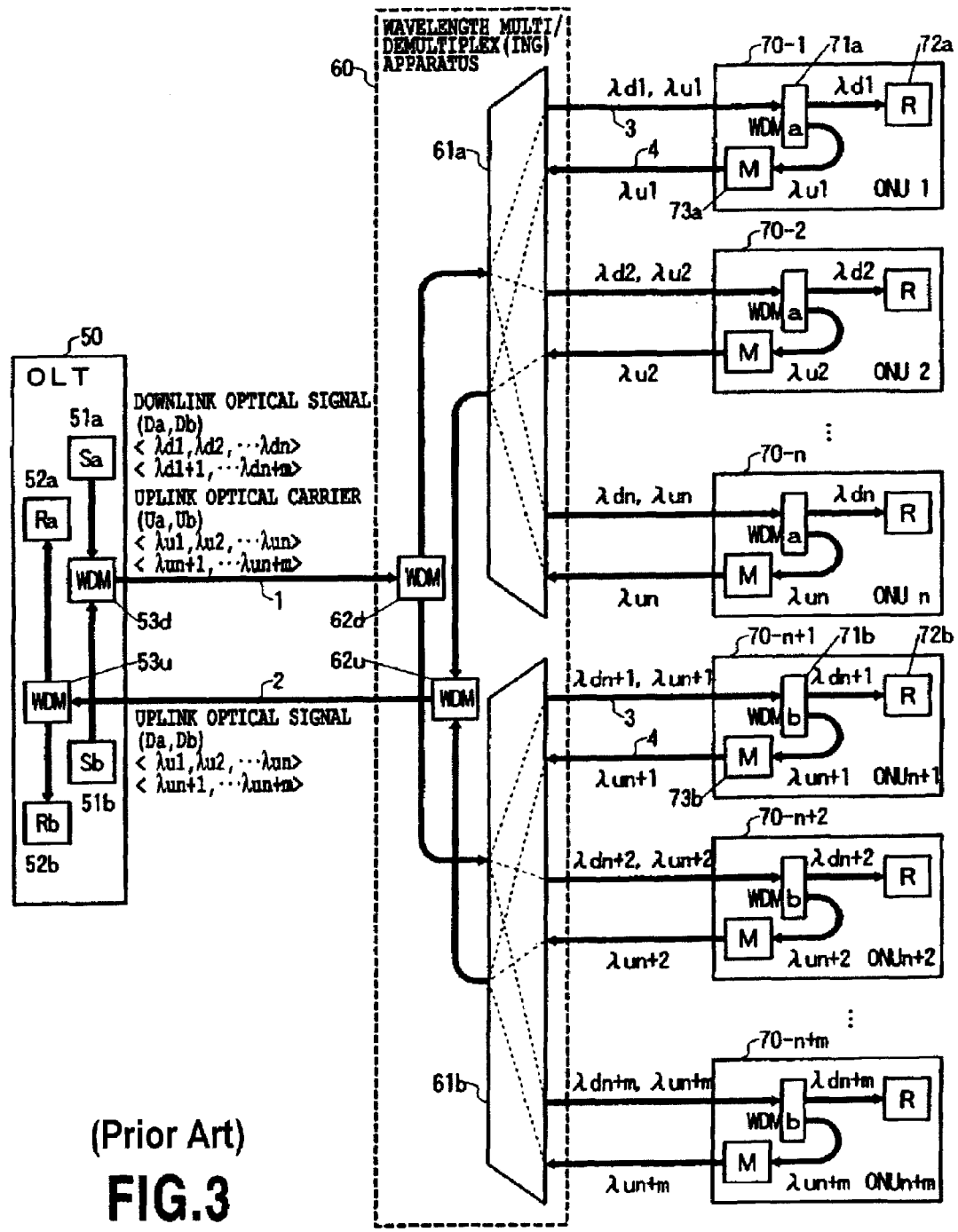
FIG. 3 is a diagram showing an example of an additional installation in the conventional optical wavelength-division multiplex(ing) access system.
Figure 4:
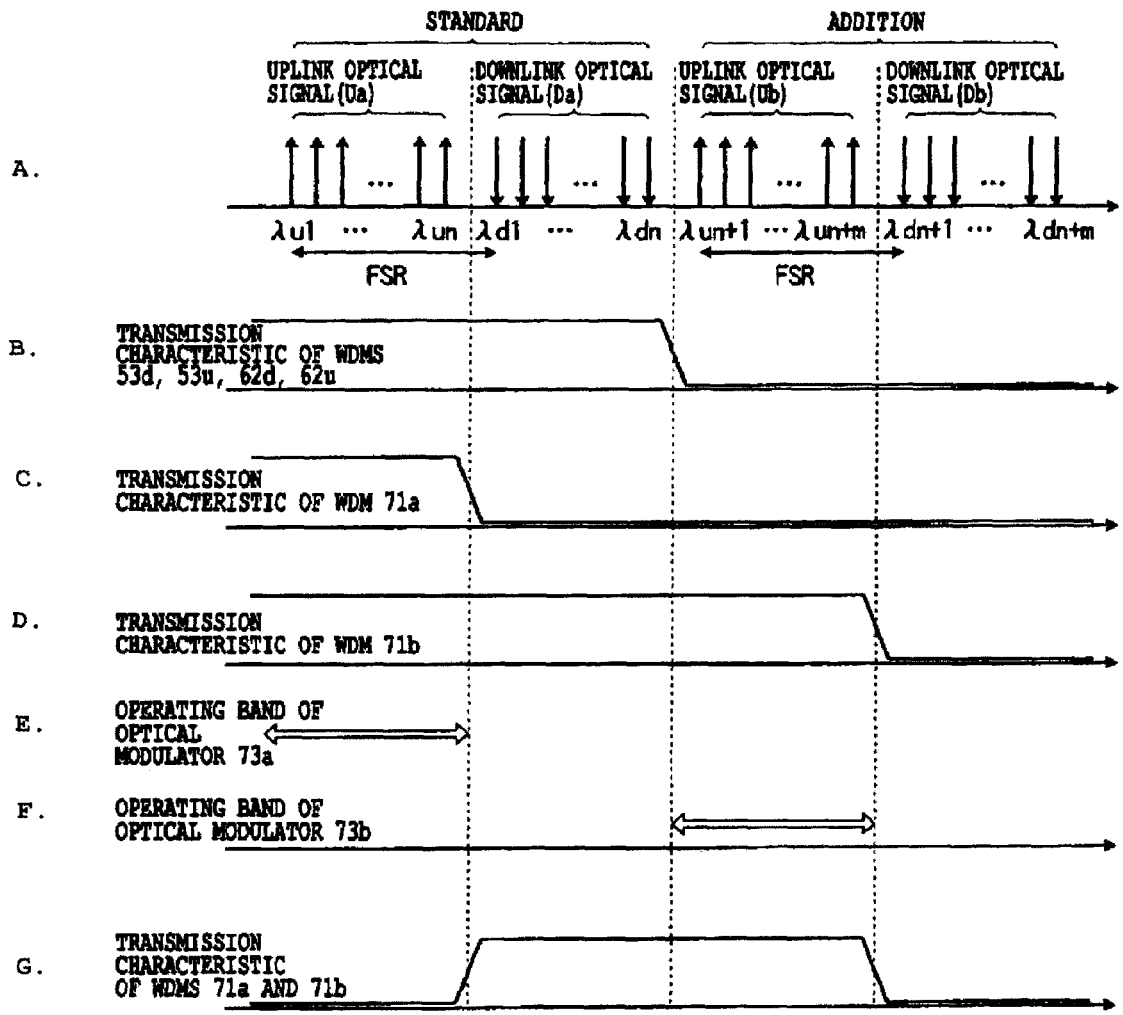
FIGS. 4A to 4G are diagrams showing the characteristics of a conventional WDM coupler and an optical modulator in the additionally installed configuration.
Figure 13A:
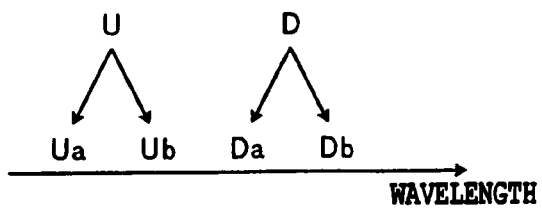
FIGS. 13A to 13D are diagrams showing the characteristics of assignment of standard and additional wavelength bands according to the present invention.
Figure 13B:
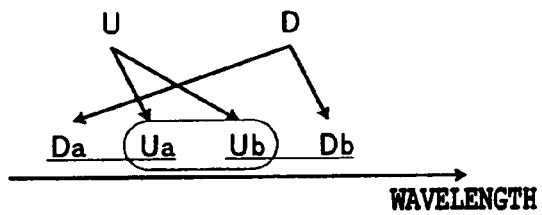
Figure 13C:
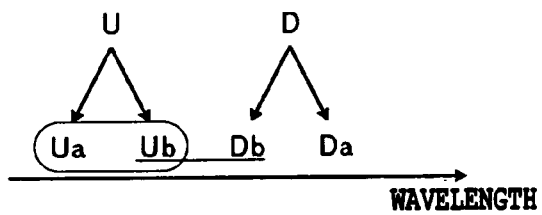
Figure 13D:
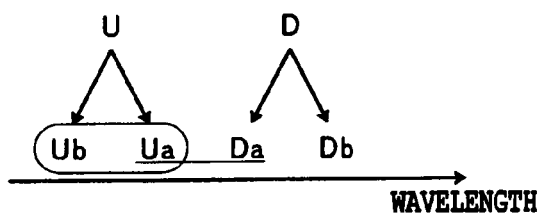

FIGS. 13A to 13D show the characteristic relating to the assignment of standard and additional wavelengths according to the present invention. In FIGS. 13A to 13D, "a" denotes the standard, and "b" denotes the addition. In this case, with the method shown in FIG. 13A, each of the wavelength bands U and D is divided on the wavelength axis. The resultant wavelength bands Ua, Ub, Da, and Db are arranged in this order (or the reverse order). In contrast, with the method shown in FIGS. 13B, 13C, and 13D, the wavelength bands Ua and Ub are adjacent to each other, and at least either the wavelength bands Ua and Da or the wavelength bands Ub and Db are adjacent to each other (as shown by underlines in the figures). This method allows all the ONUs to conform to the same specifications as shown in the above embodiments. FIG. 13A corresponds to FIG. 4 (conventional example), and FIGS. 13B, 13C, and 13D correspond to FIG. 6 (first embodiment), FIG. 7 (second embodiment), and FIG. 8 (third embodiment).

INDUSTRIAL APPLICABILITY

As described above, according to the present invention, the wavelength band Ua for uplink optical signals assigned to the standard ONUs and the wavelength band Ub for uplink optical signals assigned to the additional ONUs are set adjacent to each other. This makes it possible to minimize the operating band or light emission band of uplink optical signal transmitting means (optical modulators, optical transmitters composed of wavelength variable light sources, or optical transmitters composed of broadband light sources) for using the standard and additional ONUs to transmit uplink optical signals. As a result, all the ONUs may conform to the same specifications.

Further, in a configuration in which the OLT supplies optical carriers for uplink signals to the ONUs, the wavelength band demultiplexers of the ONUs, which separates optical carriers for uplink signals from downlink optical signals, may all conform to the same specifications. Thus, ONUs, accommodated in the OLT, can be additionally installed.

The invention claimed is:

1. A wavelength-division multiple access system having a center apparatus (OLT), n optical network units (ONU), and m ONUs arranged via a wavelength multi/demultiplex apparatus, the OLT and the wavelength multi/demultiplex apparatus being connected together in a multiplex section via multiplex section optical fibers, the wavelength multi/demultiplex apparatus and the ONUs being connected together in an access section via access section optical fibers, downlink optical signals from the OLT to the ONUs and uplink optical signals from the ONUs to the OLT being transmitted through the multiplex section using wavelengths assigned to the respective ONUs while multiplexing the wavelengths, the wavelength multi/demultiplex apparatus carrying out wavelength multiplexing or demultiplexing for bidirectional transmissions, wherein a wavelength band Da (wavelengths $\lambda d1$ to $\lambda dn$) for downlink optical signals corresponding to the n ONUs, a wavelength band Ua (wavelengths $\lambda u1$ to $\lambda un$) for uplink optical signals corresponding to the n ONUs, a wavelength band Db (wavelengths $\lambda dn+1$ to $\lambda dn+m$) for downlink optical signals corresponding to the m ONUs, and a wavelength band Ub (wavelengths $\lambda un+1$ to $\lambda un+m$) for uplink optical signals corresponding to the m ONUs are set different from one another, the wavelength bands Ua and Ub are set adjacent to each other, and the wavelength bands Ua and Da or the wavelength bands Ub and Db are set adjacent to each other, said OLT comprises:
  means for multiplexing said downlink optical signals multiplexed in the wavelength band Da (wavelengths $\lambda d1$ to $\lambda dn$) and said downlink optical signals multiplexed in the wavelength band Db (wavelengths $\lambda dn+1$ to $\lambda dn+m$) and then transmitting to the multiplex section optical fibers; and
  means for demultiplexing the uplink optical signals transmitted via the multiplex section optical fibers into said uplink optical signals multiplexed in the wavelength band Ua (wavelengths $\lambda u1$ to $\lambda un$) and said uplink optical signals multiplexed in the wavelength band Ub (wavelengths $\lambda un+1$ to $\lambda un+m$);

said wavelength multi/demultiplex apparatus comprises:
  means for demultiplexing the downlink optical signals transmitted via the multiplex section optical fibers into said downlink optical signals multiplexed in the wavelength band Da (wavelengths $\lambda d1$ to $\lambda dn$) and said downlink optical signals multiplexed in the wavelength band Db (wavelengths $\lambda dn+1$ to $\lambda dn+m$); and
  means for multiplexing said unlink optical signals multiplexed in wavelength band Ua (wavelengths $\lambda u1$ to $\lambda un$) and said unlink optical signals multiplexed in wavelength band Ub (wavelengths $\lambda un+1$ to $\lambda un+m$) and then transmitting to the multiplex section optical fibers; and each of the ONUs comprises:
  downlink optical signal receiving means for receiving a downlink optical signal of one of the wavelengths $\lambda d1$ to $\lambda dn+m$ in the wavelength bands Da and Db which wavelength is assigned to the ONU; and
  uplink optical signal transmitting means for transmitting an uplink optical signal of one of the wavelengths $\lambda u1$ to $\lambda un+m$ in the wavelength bands Ua and Ub which wavelength is assigned to the ONU or an uplink optical signal within a broad band including the wavelength bands Ua and Ub.

2. An optical wavelength-division multiple access system according to claim 1, wherein the wavelength bands Da and Db for the downlink optical signals and the wavelength bands Ua and Ub for the uplink optical signals are set on the wavelength axis in order of
the wavelength bands Da, Ua, Ub, and Db or
the wavelength bands Db, Ub, Ua, and Da.

3. An optical wavelength-division multiple access system according to claim 1, wherein the wavelength bands Da and Db for the downlink optical signals and the wavelength bands Ua and Ub for the uplink optical signals are set on the wavelength axis in order of
the wavelength bands Ua, Ub, Db, and Da or
the wavelength bands Da, Db, Ub, and Ua.

4. An optical wavelength-division multiple access system according to claim 1, wherein the wavelength bands Da and Db for the downlink optical signals and the wavelength bands Ua and Ub for the uplink optical signals are set on the wavelength axis in order of
the wavelength bands Ub, Ua, Da, and Db or
the wavelength bands Db, Da, Ua, and Ub.

5. An optical wavelength-division multiple access system according to claim 1, wherein
a connection is made to each ONU in the access section via two access section optical fibers,
the OLT is configured to multiplex the uplink optical carriers in the wavelength bands Ua and Ub (wavelengths $\lambda u1$ to $\lambda un+m$) and the downlink optical signals in the wavelength bands Da and Db (wavelengths $\lambda d1$ to $\lambda dn+m$) and to transmit to the multiplex section optical fiber,
the wavelength multi/demultiplex apparatus is configured to demultiplex the uplink optical carrier and the downlink optical signal, each of the carrier and the signal having a wavelength corresponding to the ONU, from the multiplexed uplink optical carriers and the multiplexed downlink optical signals which are transmitted via the multiplex section optical fiber and to output the demultiplexed carrier and signal to each of the ONUs via one of the access section optical fiber, and further, to multiplex the uplink optical signals transmitted via the other of the access section optical fiber, each of the uplink optical signal having a wavelength that corresponds to the ONU and to output multiplexed uplink optical signals in the wavelength bands Ua and Ub (wavelengths $\lambda u1$ to $\lambda un+m$) to the multiplex section optical fiber, and
each of the ONUs further comprises
a wavelength band multiplexer which separates the wavelength bands Ua and Ub for the uplink optical signals from the wavelength bands Da and Db for the downlink optical signals and which separates an uplink optical carrier from a downlink optical signal which are transmitted via the one of the access section optical fiber, the uplink optical carrier and the downlink optical signal having a wavelength corresponding to the ONU; and
an optical modulator which operates as the uplink optical signal transmitting means and which modulates the uplink optical carrier having the wavelength corresponding to the ONU separated by the wavelength band demultiplexer and then transmits the modulated signal to the other access section optical fiber.

6. An optical wavelength-division multiple access system according to claim 1, wherein
a connection is made to each ONU in the access section via one access section optical fiber, and
each of the ONU further comprises
a wavelength band demultiplexer which is characterized by separating the wavelength bands Ua and Ub for the uplink optical signals from the wavelength bands for the downlink optical signals, said wavelength band demultiplexer outputs a downlink optical signal to the downlink optical signal receiving means via the access section optical fiber and further outputs an uplink optical signal generated by the uplink optical signal transmitting means to the wavelength multi/demultiplex apparatus via the access section optical fiber, the downlink optical signal and the uplink optical signal having the wavelength corresponding to the ONU.

7. An optical network unit (ONU) used in a wavelength-division multiple access system having a center apparatus (OLT), n ONUs, and m ONUs arranged via a wavelength multi/demultiplex apparatus, the OLT and the wavelength multi/demultiplex apparatus being connected together in a multiplex section via a multiplex section optical fiber, the wavelength multi/demultiplex apparatus and the ONUs being connected together in an access section via an access section optical fiber, downlink optical signals from the OLT to the ONUs and uplink optical signals from the ONUs to the OLT being transmitted through the multiplex section using wavelengths assigned to the respective ONUs while multiplexing the wavelengths, the wavelength multi/demultiplex apparatus carrying out wavelength multiplexing or demultiplexing for bidirectional transmissions, wherein a wavelength band Da (wavelengths $\lambda d1$ to $\lambda dn$) for downlink optical signals corresponding to the n ONUs, a wavelength band Ua (wavelengths $\lambda u1$ to $\lambda un$) for uplink optical signals corresponding to the n ONUs, a wavelength band Db (wavelengths $\lambda dn+1$ to $\lambda dn+m$) for downlink optical signals corresponding to the m ONUs, and a wavelength band Ub (wavelengths $\lambda un+1$ to $\lambda un+m$) for uplink optical signals corresponding to the m ONUs are set different from one another, the wavelength bands Ua and Ub are set adjacent to each other, and the wavelength bands Ua and Da or the wavelength bands Ub and Db are set adjacent to each other, the ONU comprising:
downlink optical signal receiving means for receiving a downlink optical signal of one of the wavelengths $\lambda d1$ to $\lambda dn+m$ in the wavelength bands Da and Db which wavelength is assigned to the ONU; and
uplink optical signal transmitting means for transmitting an uplink optical signal of one of the wavelengths $\lambda u1$ to $\lambda un+m$ in the wavelength bands Ua and Ub which wavelength is assigned to the ONU or an uplink optical signal within a broad band including the wavelength bands Ua and Ub.

8. An optical network unit (ONU) used in a wavelength-division multiple access system having a center apparatus (OLT), n ONUs, and m ONUs arranged via a wavelength multi/demultiplex apparatus, the OLT and the wavelength multi/demultiplex apparatus being connected together in a multiplex section via a multiplex section optical fiber, the wavelength multi/demultiplex apparatus and the ONUs being connected together in an access section via an access section optical fiber, downlink optical signals from the OLT to the ONUs and uplink optical signals from the ONUs to the OLT being transmitted through the multiplex section using wavelengths assigned to the respective ONUs while multiplexing the wavelengths, the wavelength multi/demultiplex apparatus carrying out wavelength multiplexing or demultiplexing for bidirectional transmissions, wherein a wavelength band Da (wavelengths $\lambda d1$ to $\lambda dn$) for downlink optical signals corresponding to the n ONUs, a wavelength band Ua (wavelengths $\lambda u1$ to $\lambda un$) for uplink optical signals corresponding to the n ONUs, a wavelength band Db (wavelengths $\lambda dn+1$ to $\lambda dn+m$) for downlink optical signals corresponding to the m ONUs, and a wavelength band Ub (wavelengths $\lambda un+1$ to $\lambda un+m$) for uplink optical signals corresponding to the m ONUs are set different from one another, the wavelength bands Ua and Ub are set adjacent to each other, and the wavelength bands Ua and Da or the wavelength bands Ub and Db are set adjacent to each other, a connection is made to each ONU in the access section via two access section optical fibers, the OLT is configured to multiplex the uplink optical carriers in the wavelength bands Ua and Ub (wavelengths $\lambda u1$ to $\lambda un+m$) and downlink optical signals in the wavelength bands Da and Db (wavelengths $\lambda d1$ to $\lambda dn+m$) and to transmit to the multiplex section optical fiber, the wavelength multi/demultiplex apparatus is configured to demultiplex the uplink optical carrier and the downlink optical signal, each of the carrier and the signal having a wavelength corresponding to the ONU, from the multiplexed uplink optical carriers and the multiplexed downlink optical signals which are transmitted via the multiplex section optical fiber and to output the demultiplexed carrier and signal to each of the ONUs via one of the access section optical fiber, and further, to multiplex the uplink optical signals transmitted via the other of the access section optical fiber, each of the uplink optical signal having a wavelength that corresponds to the ONU and to output multiplexed uplink optical signals in the wavelength bands Ua and Ub (wavelengths $\lambda u1$ to $\lambda un+m$) to the multiplex section optical fiber, the ONU comprising:

a wavelength band multiplexer which separates the wavelength bands Ua and Ub for the uplink optical signals from the wavelength bands Da and Db for the downlink optical signals and which separates an uplink optical carrier from a downlink optical signal which are transmitted via the one of the access section optical fiber, the uplink optical carrier and the downlink optical signal having a wavelength corresponding to the ONU; and;

downlink optical signal receiving means for receiving a downlink optical signal of one of the wavelengths $\lambda d1$ to $\lambda dn+m$ in the wavelength bands Da and Db which wavelength is assigned to the ONU; and an optical modulator which operates as the uplink optical signal transmitting means and which modulates the uplink optical carrier having the wavelength corresponding to the ONU separated by the wavelength band demultiplexer and then transmits the modulated signal to the other access section optical fiber.

9. An optical network unit (ONU) used in a wavelength-division multiple access system having a center apparatus (OLT), n ONUs, and m ONUs arranged via a wavelength multi/demultiplex apparatus, the OLT and the wavelength multi/demultiplex apparatus being connected together in a multiplex section via a multiplex section optical fiber, the wavelength multi/demultiplex apparatus and the ONUs being connected together in an access section via an access section optical fiber, downlink optical signals from the OLT to the ONUs and uplink optical signals from the ONUs to the OLT being transmitted through the multiplex section using wavelengths assigned to the respective ONUs while multiplexing the wavelengths, the wavelength multi/demultiplex apparatus carrying out wavelength multiplexing or demultiplexing for bidirectional transmissions, wherein a wavelength band Da (wavelengths $\lambda d1$ to $\lambda dn$) for downlink optical signals corresponding to the n ONUs, a wavelength band Ua (wavelengths $\lambda u1$ to $\lambda un$) for uplink optical signals corresponding to the n ONUs, a wavelength band Db (wavelengths $\lambda dn+1$ to $\lambda dn+m$) for downlink optical signals corresponding to the m ONUs, and a wavelength band Ub (wavelengths $\lambda un+1$ to $\lambda un+m$) for uplink optical signals corresponding to the m ONUs are set different from one another, the wavelength bands Ua and Ub are set adjacent to each other, and the wavelength bands Ua and Da or the wavelength bands Ub and Db are set adjacent to each other, a connection is made to each ONU in the access section via one access section optical fiber, the ONU comprising:

a wavelength band demultiplexer which is characterized by separating the wavelength bands Ua and Ub for uplink optical signals from the wavelength bands for downlink optical signals, said wavelength band demultiplexer outputs a downlink optical signal to the downlink optical signal receiving means via the access section optical fiber and further outputs an uplink optical signal generated by the uplink optical signal transmitting means to the wavelength multi/demultiplex apparatus via the access section optical fiber, the downlink optical signal and the uplink optical signal having the wavelength corresponding to the ONU, to the access section optical fiber;

downlink optical signal receiving means for receiving a downlink optical signal of one of the wavelengths $\lambda d1$ to $\lambda dn+m$ in the wavelength bands Da and Db which wavelength is assigned to the ONU; and uplink optical signal transmitting means for transmitting an uplink optical signal of one of the wavelengths $\lambda u1$ to $\lambda un+m$ in the wavelength bands Ua and Ub which wavelength is assigned to the ONU or an uplink optical signal within a broad band including the wavelength bands Ua and Ub.

\* \* \* \* \*